United States Patent [10] Patent No.: US 12,110,963 B2
Orlando et al. (45) Date of Patent: Oct. 8, 2024

(54) GEARBOX ASSEMBLY

(71) Applicants: GE Avio S.r.l., Rivalta di Torino (IT);
GE Aviation Czech s.r.o., Prague (CZ)

(72) Inventors: Leonardo Orlando, Turin (IT); Juraj Hrubec, Prague (CZ)

(73) Assignees: GE AVIO S.R.L., Rivalta di Torino (IT); GE AVIATION CZECH S.R.O., Prague (CZ)

( * ) Notice: Subject to any disclaimer, the term of this patent is extended or adjusted under 35 U.S.C. 154(b) by 0 days.

(21) Appl. No.: 18/450,050

(22) Filed: Aug. 15, 2023

(65) Prior Publication Data

US 2024/0191794 A1  Jun. 13, 2024

(30) Foreign Application Priority Data

Nov. 21, 2022 (IT) .................. 102022000023943

(51) Int. Cl.
| | |
|---|---|
| *F16H 57/08* | (2006.01) |
| *F16C 19/38* | (2006.01) |
| *F16H 1/28* | (2006.01) |
| *F16H 3/66* | (2006.01) |
| *F16H 3/44* | (2006.01) |

(52) U.S. Cl.
CPC ............ *F16H 57/08* (2013.01); *F16C 19/38* (2013.01); *F16H 1/28* (2013.01); *F16C 2240/40* (2013.01); *F16C 2240/70* (2013.01); *F16C 2240/80* (2013.01); *F16C 2240/82* (2013.01); *F16C 2240/84* (2013.01); *F16C 2361/65* (2013.01); *F16H 3/44* (2013.01); *F16H 3/66* (2013.01); *F16H 3/663* (2013.01); *F16H 3/666* (2013.01); *F16H 2057/085* (2013.01)

(58) Field of Classification Search
CPC ...... F16H 57/08; F16H 2057/085; F16H 1/28; F16H 3/66; F16H 3/663; F16H 3/666; F16H 3/44; F16C 19/38; F16C 2361/65; F16C 2240/70; F16C 2240/80; F16C 2240/82; F16C 2240/84
See application file for complete search history.

(56) References Cited

U.S. PATENT DOCUMENTS

| 8,172,717 | B2 | 5/2012 | Lopez et al. |
| 8,517,672 | B2 | 8/2013 | McCooey |
| 10,119,548 | B2 | 11/2018 | Venter |
| 10,267,365 | B2 | 4/2019 | Hasting |
| 10,287,917 | B2 * | 5/2019 | Schwarz ............... F16H 1/28 |
| 10,458,279 | B2 | 10/2019 | Gedin et al. |

(Continued)

FOREIGN PATENT DOCUMENTS

| EP | 2836694 B1 | 6/2016 |
| EP | 3361122 B1 | 1/2021 |

(Continued)

*Primary Examiner* — Tinh Dang
(74) *Attorney, Agent, or Firm* — Venable LLP; Peter T. Hrubiec; Michele V. Frank

(57) ABSTRACT

A gearbox assembly includes a plurality of planet gears. At least one planet gear of the plurality of planet gears includes a layshaft. The gearbox assembly includes one or more roller bearings disposed within the layshaft and includes a plurality of rolling elements. The gearbox assembly also includes a bearing radial envelope in a range of 1.2 to 4.325. The gearbox assembly can also include a layshaft axial envelope in a range of 3.8 to 12.5.

20 Claims, 19 Drawing Sheets

(56) References Cited

U.S. PATENT DOCUMENTS

| | | |
|---|---|---|
| 11,193,557 B2 | 12/2021 | Hrubec |
| 11,371,440 B2 * | 6/2022 | Spruce ..................... F02K 3/06 |
| 2019/0360356 A1 * | 11/2019 | Savaria ................ F16H 57/082 |
| 2021/0388770 A1 | 12/2021 | Hrubec et al. |

FOREIGN PATENT DOCUMENTS

| | | | |
|---|---|---|---|
| FR | 3084427 A1 | 1/2020 | |
| WO | WO-2016178649 A1 * | 11/2016 | ............. F03D 80/70 |

\* cited by examiner

GEARBOX ASSEMBLY

CROSS REFERENCE TO RELATED APPLICATIONS

The present application claims the benefit of Italian Patent Application No. 102022000023943, filed on Nov. 21, 2022, which is hereby incorporated by reference herein in its entirety.

TECHNICAL FIELD

The present disclosure relates generally to gearbox assemblies for engines, such as turbine engines.

BACKGROUND

An engine, such as a turbine engine, may generally include a fan and a turbomachine arranged in flow communication with one another. The engine may include one or more gearbox assemblies.

BRIEF DESCRIPTION OF THE DRAWINGS

The foregoing and other features and advantages will be apparent from the following, more particular, description of various exemplary embodiments, as illustrated in the accompanying drawings, wherein like reference numbers generally indicate identical, functionally similar, and/or structurally similar elements.

DETAILED DESCRIPTION

Figure 1:
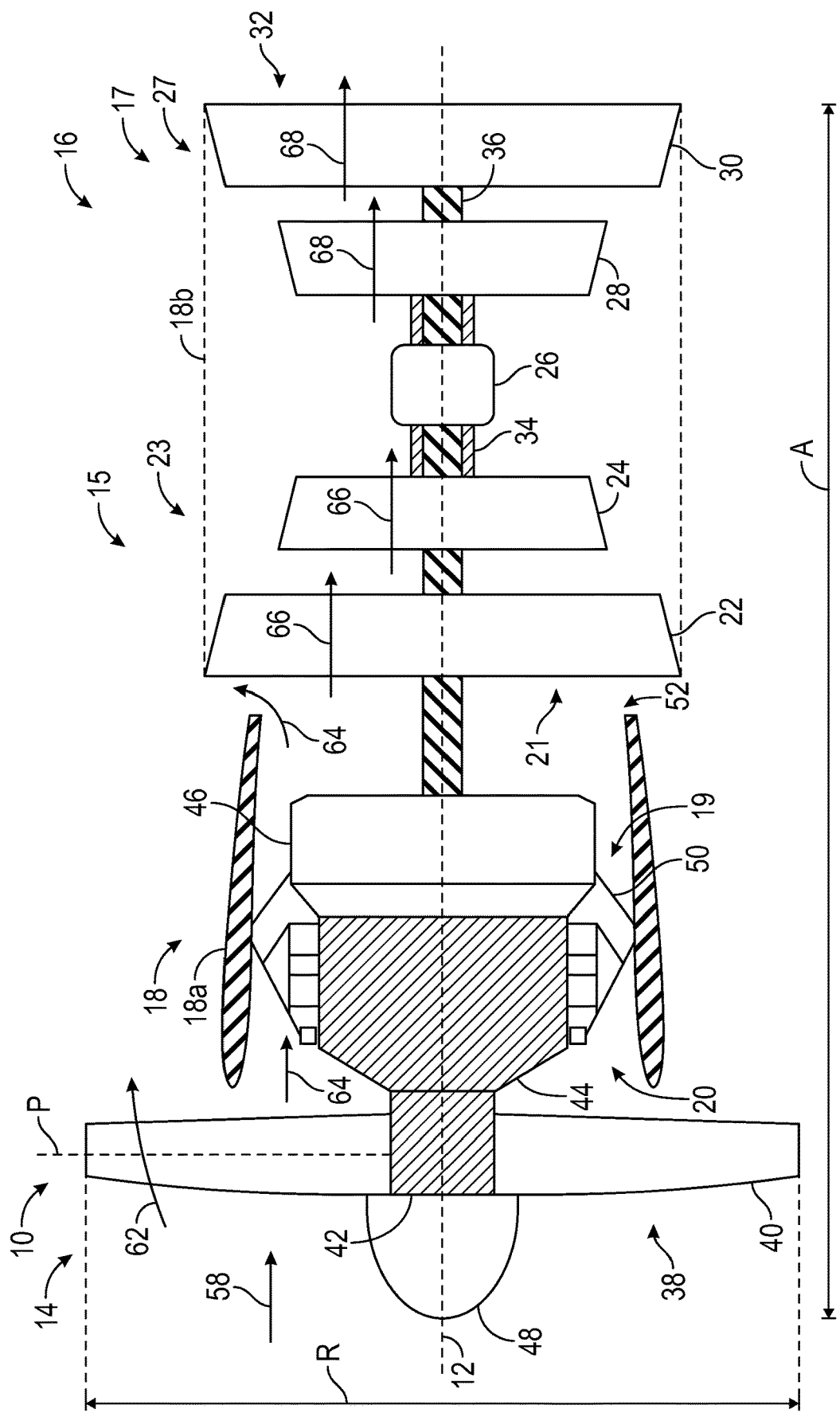
FIG. 1 is a schematic, cross-sectional diagram of an engine, taken along a centerline axis of the engine, according to the present disclosure.

Additional features, advantages, and embodiments of the present disclosure are set forth or apparent from a consideration of the following detailed description, drawings, and claims. Moreover, both the foregoing summary of the present disclosure and the following detailed description are exemplary and intended to provide further explanation without limiting the scope of the disclosure as claimed.

Various embodiments of the present disclosure are discussed in detail below. While specific embodiments are discussed, this is done for illustration purposes only. A person skilled in the relevant art will recognize that other components and configurations may be used without departing from the spirit and the scope of the present disclosure.

As used herein, the terms "first," "second," and "third" may be used interchangeably to distinguish one component from another and are not intended to signify location or importance of the individual components.

The terms "upstream" and "downstream" refer to the relative direction with respect to fluid flow in a fluid pathway. For example, "upstream" refers to the direction from which the fluid flows, and "downstream" refers to the direction to which the fluid flows.

The terms "forward" and "aft" refer to relative positions within an engine or a vehicle, and refer to the normal operational attitude of the engine or the vehicle. For example, with regard to an engine, forward refers to a position closer to an engine inlet and aft refers to a position closer to an engine nozzle or an exhaust.

The terms "coupled," "fixed," "attached," "connected," and the like, refer to both direct coupling, fixing, attaching, or connecting, as well as indirect coupling, fixing, attaching, or connecting through one or more intermediate components or features, unless otherwise specified herein.

The singular forms "a," "an," and "the" include plural references unless the context clearly dictates otherwise.

As used herein, the terms "axial" and "axially" refer to directions and orientations that extend substantially parallel to a centerline of the engine. Moreover, the terms "radial" and "radially" refer to directions and orientations that extend substantially perpendicular to the centerline of the engine. In addition, as used herein, the terms "circumferential" and "circumferentially" refer to directions and orientations that extend arcuately about the centerline of the engine.

Here and throughout the specification and claims, range limitations are combined, and interchanged. Such ranges are identified and include all the sub-ranges contained therein unless context or language indicates otherwise. For example, all ranges disclosed herein are inclusive of the endpoints, and the endpoints are independently combinable with each other.

The present disclosure provides for engines, such as unducted single fan (USF) engines, with a high-speed low-pressure turbine and a variable pitch propeller or fan. USF engines provide for a high power rating (e.g., greater than 7 megawatts). Such engines can be configured as a geared engine that includes a power gearbox utilized to transfer power from a turbine shaft, such as a low-pressure shaft, to the propeller or fan. Power gearboxes can also be utilized in other sections of the engine. In such high power engines, however, a high gear ratio is needed to drive the propeller at the required speed and torque. For example, the gear ratio of the power gearbox between the low-pressure turbine and the propeller can be in a range of 7:1 to 12:1. While the present disclosure refers to USF engines, the embodiments detailed herein may be utilized for other types of high powered engines with high gear ratios.

Power gearboxes may include a sun gear, a plurality of planet gears, and a ring gear. The sun gear meshes with the plurality of planet gears and the plurality of planet gears mesh with the ring gear. In operation, the power gearbox transfers the torque transmitted from the turbine shaft operating at a first speed to a fan shaft rotating at a second, lower speed. The sun gear may be coupled to the low-pressure shaft of the turbine rotating at the first speed. In a planet configuration of the power gearbox, the plurality of planet gears, intermeshed with the sun gear, then transfer this torque to the fan shaft through a planet carrier. In a star configuration, the ring gear is coupled to the fan shaft. In either configuration, the plurality of planet gears may include compound gears such that the plurality of planet gears each includes a first stage and a second stage. The first stage is meshed with the sun gear and the second stage is meshed with the ring gear.

The planet gears include one or more bearings, such as roller bearings, disposed therein for allowing the planet gears to rotate about a pin such that the planet gears rotate about a planet gear axis. During operation of the power gearbox, the torque applied on the planet gears generates a radial load on the bearings. The radial load generates a contact pressure on the bearings. If the contact pressure is too great, the bearings will wear faster than designed and the lifecycle of the bearings will be reduced. As engines increase in power and thrust, the contact pressure described becomes more challenging to accommodate, while at the same time, minimizing the overall weight of the engine while increasing engine efficiency of the engine.

One way to minimize overall weight of the engine is to minimize the weight of the power gearbox by making the power gearbox smaller. The inventors, seeking a need to improve upon the existing bearings and planet gears for power gearboxes, designed several different configurations of the bearings and planet gears in an effort to improve upon the size, the weight, and the efficiency of a power gearbox, thereby improving upon the size, the weight, and the efficiency of the engine.

Referring now to the drawings, FIG. 1 is a schematic, cross-sectional diagram of an engine 10, taken along a centerline axis of the engine 10, according to an embodiment of the present disclosure. As shown in FIG. 1, the engine 10 defines an axial direction A (extending parallel to a longitudinal, centerline axis 12 provided for reference) and a radial direction R that is normal to the axial direction A. In general, the engine 10 includes a fan section 14 (also referred to as a propeller section) and a turbomachine 16 disposed downstream from the fan section 14. The turbomachine 16 includes a cold section 15 and a hot section 17, detailed further below.

The turbomachine 16 depicted generally includes an outer casing 18 that is substantially tubular and defines an annular inlet 20. The outer casing 18 includes a first outer casing 18a and a second outer casing 18b (shown schematically by dashed lines in FIG. 1). As schematically shown in FIG. 1, the first outer casing 18a defines a bypass duct 19 and the second outer casing 18b defines a core duct 21. The second outer casing 18b encases, in serial flow relationship, a compressor section 23 including a booster or a low pressure (LP) compressor 22 followed downstream by a high pressure (HP) compressor 24, a combustion section 26, a turbine section 27 including a high pressure (HP) turbine 28 followed downstream by a low pressure (LP) turbine 30, and a jet exhaust nozzle section 32. A high pressure (HP) shaft 34 or spool drivingly connects the HP turbine 28 to the HP compressor 24 to rotate the HP turbine 28 and the HP compressor in unison. A low pressure (LP) shaft 36 drivingly connects the LP turbine 30 to the LP compressor 22 to rotate the LP turbine 30 and the LP compressor 22 in unison. The compressor section 23, the combustion section 26, the turbine section 27, and the jet exhaust nozzle section 32 together define the core duct 21, also referred to as a core air flowpath. The cold section 15 of the turbomachine 16 includes an inlet to the core duct 21, the compressor section 23, and a diffuser from the compressor section 23 to the combustion section 26. The hot section 17 of the turbomachine 16 includes the combustion section 26, the turbine section 27, and the jet exhaust nozzle section 32. A core of the turbomachine 16 includes the HP compressor 24, the combustion section 26, and the HP turbine 29.

For the embodiment depicted in FIG. 1, the fan section 14 includes a fan 38 (e.g., a variable pitch fan), also referred to as a propeller, having a plurality of fan blades 40 coupled to a disk 42 in a spaced apart manner. As depicted in FIG. 1, the fan blades 40 extend outwardly from the disk 42 generally along the radial direction R. Each fan blade 40 is rotatable relative to the disk 42 about a pitch axis P by virtue of the fan blades 40 being operatively coupled to an actuation member configured to collectively vary the pitch of the fan blades 40 in unison. The fan blades 40, the disk 42, and the actuation member are together rotatable about the centerline axis 12 via a fan shaft 44 that is powered by the LP shaft 36 across a power gearbox 46, also referred to as a gearbox assembly 46. The gearbox assembly 46 is shown schematically in FIG. 1. The gearbox assembly 46 includes a plurality of gears for adjusting the rotational speed of the fan shaft 44 and, thus, the fan 38 relative to the LP shaft 36 to a more efficient rotational fan speed. The disk 42 is covered by a rotatable fan hub 48 aerodynamically contoured to promote an airflow through the plurality of fan blades 40. In FIG. 1, the engine 10 is an unducted single fan engine. In this way, the fan blades 40 are not surrounded by a nacelle, a casing, or another type of covering such that the fan 38 is an open fan. Such engines provide a higher bypass ratio by utilizing external fan blades, and, thus, provide for an increase in propulsive efficiency as compared to ducted fan engines (e.g., engines that include a covering over the fan blades such as a fan that is positioned within the nacelle).

Referring still to the exemplary embodiment of FIG. 1, the first outer casing 18a circumferentially surrounds the gearbox assembly 46, and the gearbox assembly 46 is coupled to the first outer casing 18a via one or more linkages 50. Although not depicted in the schematic illustration of FIG. 1, a portion of the first outer casing 18a may also circumferentially surround a portion of the second outer casing 18b. The bypass duct 19 defines a bypass airflow passage and a bypass airflow is directed through the bypass duct 19. The first outer casing 18a includes a nozzle 52 from which the bypass airflow may exit into the atmosphere, as detailed further below. In some embodiments, the bypass duct 19 includes a fan such that the engine 10 includes both an unducted fan (e.g., the fan 38) and a ducted fan that both serve to generate thrust through the movement of air without passage through the turbomachine 16.

During operation of the engine 10, a volume of air 58 enters the engine 10 through the fan section 14. As the volume of air 58 passes across the fan blades 40, a first portion of air 62 is directed or routed to the atmosphere (e.g., bypasses the bypass duct 19 and bypasses the turbomachine 16), a second portion of air 64 is directed or is routed into the annular inlet 20 of the first outer casing 18a. The second portion of air 64 flows through the bypass duct 19 and is directed to the atmosphere through the nozzle 52. The second portion of air 64 is also split into a third portion of air 66 that is directed or is routed into the core duct 21 and into the LP compressor 22. The pressure of the third portion of air 66 is then increased as it is routed through the HP compressor 24 and into the combustion section 26, where the highly pressurized air is mixed with fuel and burned to provide combustion gases 68. The engine 10 therefore includes an unducted fan (e.g., fan 38) through which a portion of air is directed to atmosphere and a portion of the air is directed into two concentric or non-concentric ducts (e.g., the bypass duct 19 and the core duct 21), thereby forming a three stream engine architecture with three paths for air that passes through the fan 38.

The combustion gases 68 are routed into the HP turbine 28 and expanded through the HP turbine 28 where a portion of thermal and/or of kinetic energy from the combustion gases 68 is extracted via sequential stages of HP turbine stator vanes that are coupled to the second outer casing 18b and HP turbine rotor blades that are coupled to the HP shaft 34, thus, causing the HP shaft 34 to rotate, thereby supporting operation of the HP compressor 24. The combustion gases 68 are then routed into the LP turbine 30 and expanded through the LP turbine 30. Here, a second portion of thermal and kinetic energy is extracted from the combustion gases 68 via sequential stages of LP turbine stator vanes that are coupled to the second outer casing 18b and LP turbine rotor blades that are coupled to the LP shaft 36, thus, causing the LP shaft 36 to rotate. This supports operation of the LP compressor 22 and rotation of the fan 38 via the gearbox assembly 46.

The combustion gases 68 are subsequently routed through the jet exhaust nozzle section 32 of the turbomachine 16 to provide propulsive thrust. Simultaneously, the pressure of the second portion of air 64 is substantially increased as the second portion of air 64 is routed through the bypass duct 19 before being exhausted from the nozzle 52 of the engine 10, also providing propulsive thrust.

The engine 10 depicted in FIG. 1 is by way of example only. In other exemplary embodiments, the engine 10 may have any other suitable configuration. For example, in other exemplary embodiments, the fan 38 may be configured in any other suitable manner (e.g., as a fixed pitch fan) and further may be supported using any other suitable fan frame configuration. Moreover, in other exemplary embodiments, any other suitable number or configuration of compressors, turbines, shafts, or a combination thereof may be provided. In still other exemplary embodiments, aspects of the present disclosure may be incorporated into any other suitable gas engine, such as, for example, turbofan engines, propfan engines, and/or turboshaft engines.

Figure 2:
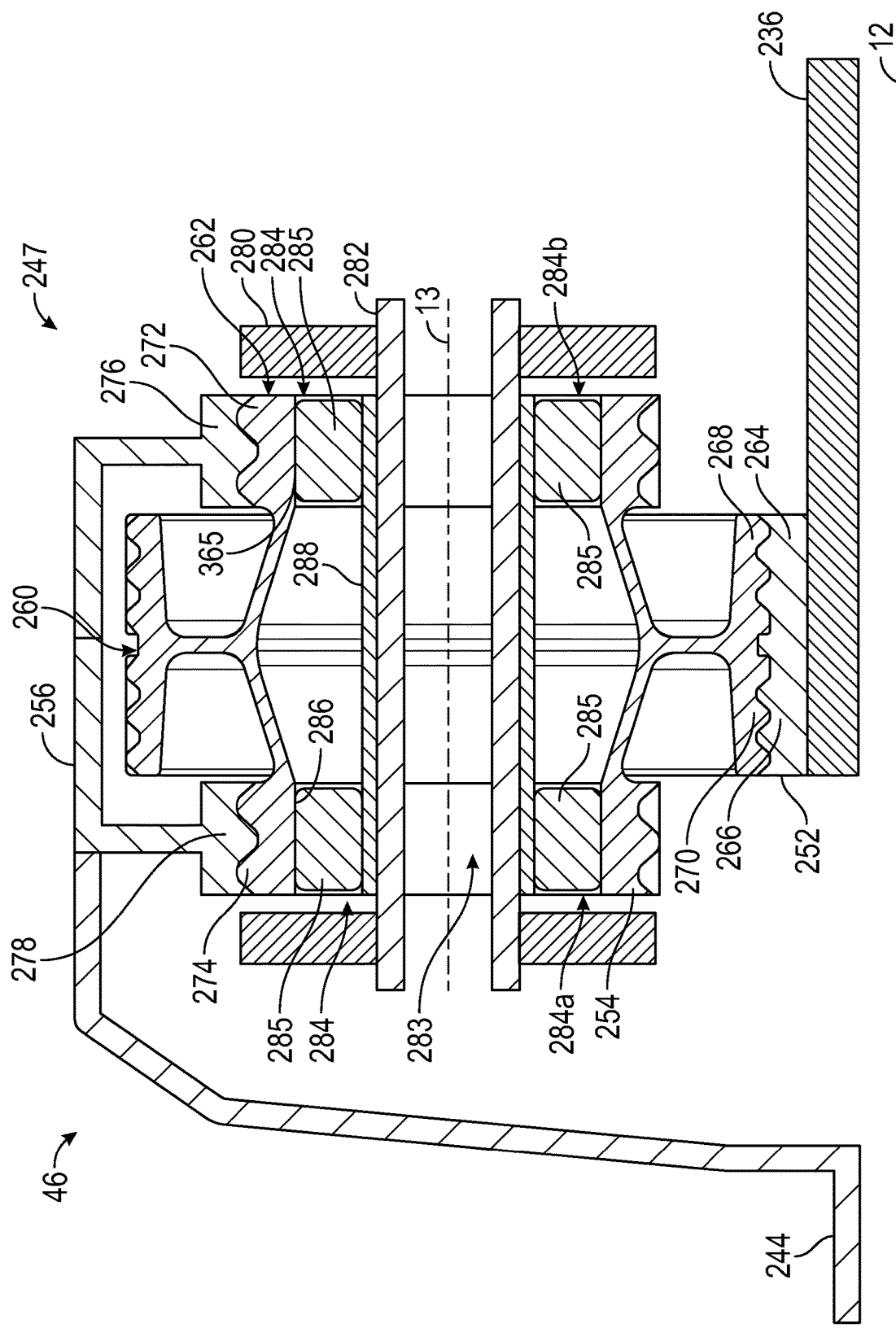
FIG. 2 is a schematic, cross-sectional side view of a gearbox assembly for an engine, taken along a centerline axis of the engine, according to the present disclosure.

FIG. 2 is a schematic, cross-sectional side view of the gearbox assembly 46, taken along the centerline axis 12, according to the present disclosure. The gearbox assembly 46 includes an epicyclic gear assembly 247 in a compound symmetrical arrangement. The epicyclic gear assembly 247 includes a sun gear 252, a plurality of planet gears 254 (only one of which is visible in FIG. 2), and a ring gear 256. For clarity, only a portion of the gears is shown. The gearbox assembly 46 is a star type or a rotating ring gear type gearbox assembly (e.g., the ring gear 256 is rotating and a planet carrier 280 is fixed and stationary). In such an arrangement, the fan 38 (FIG. 1) is driven by the ring gear 256. In this way, the ring gear 256 is an output of the gearbox assembly 46. However, other suitable types of gearbox assemblies may be employed. In one non-limiting embodiment, the gearbox assembly 46 may be a planetary arrangement, in which the ring gear 256 is held fixed, with the planet carrier 280 allowed to rotate. In such an arrangement, the fan 38 (FIG. 1) is driven by the planet carrier 280. In this way, the plurality of planet gears 254 are the output of the gearbox assembly 46.

An input shaft 236 is coupled to the sun gear 252. The input shaft 236 is coupled to the turbine section 27 (FIG. 1). For example, the input shaft 236 can be coupled to the LP shaft 36 (FIG. 1). Radially outward of the sun gear 252, and intermeshing therewith, is the plurality of planet gears 254 that are coupled together and supported by the planet carrier 280. The planet carrier 280 supports and constrains the plurality of planet gears 254 such that the plurality of planet gears 254 do not together rotate around the sun gear 252 while enabling each planet gear of the plurality of planet gears 254 to rotate about its own axis 13. Radially outwardly of the plurality of planet gears 254, and intermeshing therewith, is the ring gear 256, which is an annular ring gear. FIG. 2 shows the ring gear 256 is formed of two separate components that are coupled together. In some embodiments, the ring gear 256 may be a single unitary component. The ring gear 256 is coupled via an output shaft 244 to the fan 38 (FIG. 1) and rotates to drive rotation of the fan 38 (FIG. 1) about the centerline axis 12. For example, the output shaft 244 is coupled to the fan shaft 44 (FIG. 1). In some embodiments, the output shaft 244 and the fan shaft 44 (FIG. 1) are formed as a single integral component.

Each of the plurality of planet gears 254 is a compound gear that includes a first stage planet gear 260 and a second stage planet gear 262 coupled together. As detailed further below, the first stage planet gear 260 includes a greater diameter than a diameter of the second stage planet gear 262. Each of the sun gear 252, the plurality of planet gears 254, and the ring gear 256 comprises teeth about their periphery to intermesh with the other gears. For example, each of the sun gear 252, the plurality of planet gears 254, and the ring gear 256 are double helical gears with first and second sets of helical teeth that are all inclined at the same acute angle relative to a planet gear axis. In particular, the sun gear 252 comprises a first set of sun gear teeth 264 and a second set of sun gear teeth 266. Each of the first stage planet gears 260 includes a first set of planet gear teeth 268 and a second set of planet gear teeth 270, and each of the second stage planet gears 262 includes a third set of planet gear teeth 272 and a fourth set of planet gear teeth 274. The ring gear 256 includes a first set of ring gear teeth 276 and a second set of ring gear teeth 278. The sun gear 252, the plurality of planet gears 254, and the ring gear 256 may include any type of gear, such as, for example, spur gears (e.g., gear teeth that are straight cut and are not set at an angle relative to the planet gear axis), or the like.

The first set of planet gear teeth 268 and the second set of planet gear teeth 270 of the first stage planet gear 260 mesh with the first set of sun gear teeth 264 and the second set of sun gear teeth 266 of the sun gear 252, respectively. The third set of planet gear teeth 272 of the second stage planet gear 262 meshes with the first set of ring gear teeth 276 of the ring gear 256. The fourth set of planet gear teeth 274 of the second stage planet gear 262 meshes with the second set of ring gear teeth 278 of the ring gear 256.

Each of the planet gears 254 of the plurality of planet gears 254 includes a pin 282 about which a respective planet gear 254 rotates. The pin 282 is coupled to the planet carrier 280 and is disposed within a bore 283 of a respective planet gear 254. Lubricant (e.g., oil) is provided between the pin 282 and a respective planet gear 254 such that the planet gear 254 rotates with respect to the pin 282. The second stage planet gear 262 is supported by one or more roller bearings 284 that are disposed within the bore 283. FIG. 2 shows the one or more roller bearings 284 include two roller bearings 284 including a first roller bearing 284a and a second roller bearing 284b. A respective planet gear 254, however, can include any number of roller bearings 284, as desired. The second roller bearing 284b is located aft of the first roller bearing 284a. In this way, the first roller bearing 284a is referred to as a forward roller bearing and the second roller bearing 284b is referred to as an aft roller bearing. The roller bearings 284 allow rotation of the planet gear 254 with respect to the pin 282. A distance between the first roller bearing 284a and the second roller bearing 284b is an axial distance and is measured from an axially center of the respective roller bearings. The distance between the first roller bearing 284a and the second roller bearing 284b is, for example, in a range of one hundred fifty-nine millimeters (159 mm) to three hundred eleven millimeters (311 mm). The distance between the first roller bearing 284a and the second roller bearing 284b is determined by the design of the planet gear 254 based on considerations related to the design and producibility of the planet gear 254 and of the roller bearings 284, as detailed further below.

Figure 3:
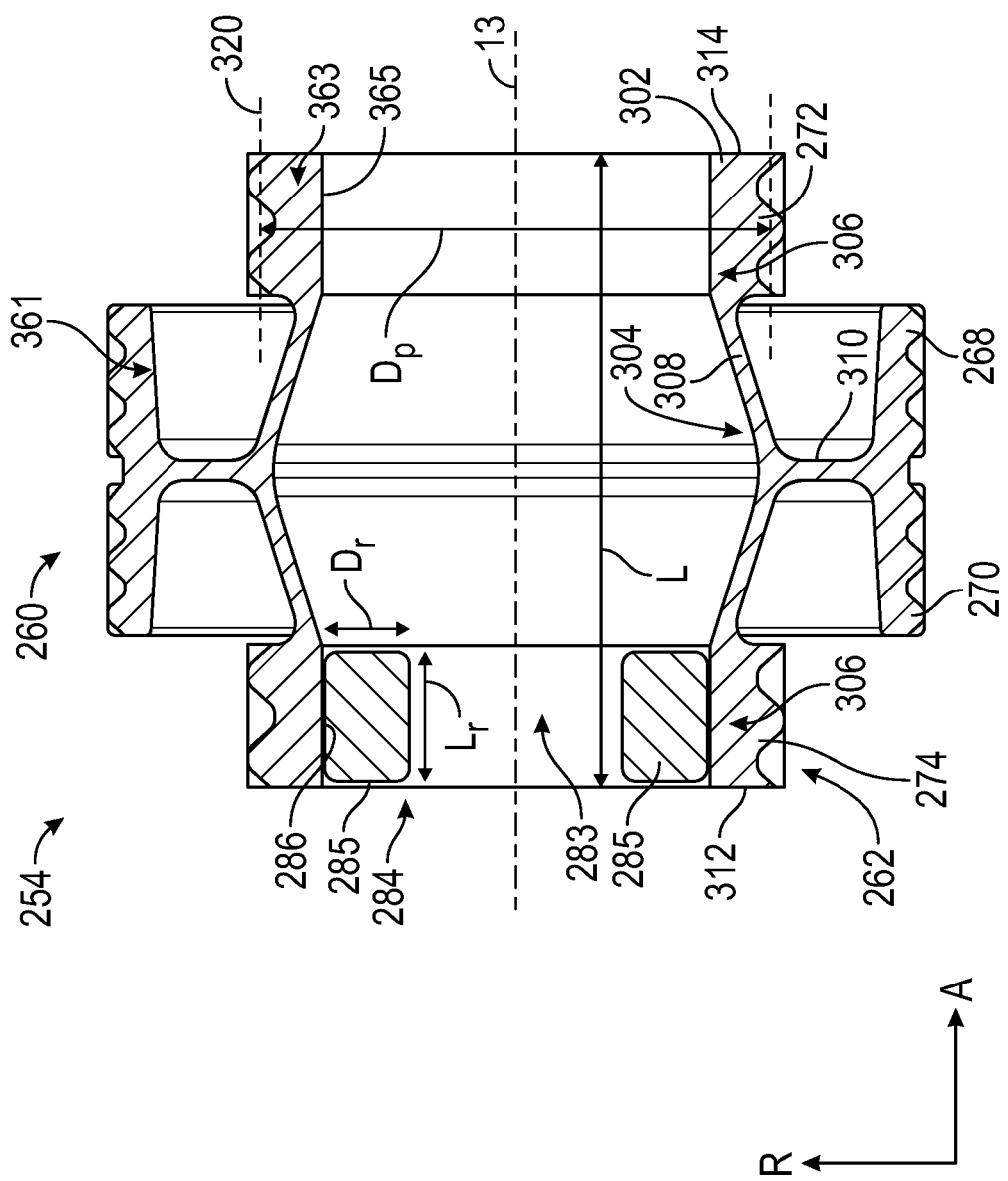
FIG. 3 is a schematic, cross-sectional side view of a planet gear of the gearbox assembly of FIG. 2, according to the present disclosure.

The one or more roller bearings 284 include an outer race 286 and an inner race 288. The outer race 286 is defined by a radially inner surface 365 of the second stage planet gear 262. In this way, the outer race 286 is integral with the planet gear 254 (e.g., with a layshaft 302 as shown in FIG. 3) and is positioned within a rim of the planet gear 254. In some embodiments, the outer race 286 is a separate component from the second stage planet gear 262. The inner race 288 is coupled to the pin 282. The one or more roller bearings 284 include a plurality of rolling elements 285 disposed between the outer race 286 and the inner race 288. FIG. 2 shows four such rolling elements 285, but the one or more roller bearings 284 may each include any number of rolling elements 285, as detailed further below. The plurality of rolling elements 285 allows rotation of the planet gear 254 with respect to the pin 282. The plurality of rolling elements 285 includes generally cylindrical rolling elements. The plurality of rolling elements 285, however, may include ball bearing elements, tapered rolling elements, needle rolling elements, or the like. The plurality of rolling elements 285 include a number $N_r$ of rolling elements 285 and include a size selected based on a radial load on the one or more roller bearings 284 and a contact pressure of the plurality of rolling elements 285 during operation of the gearbox assembly 46, as detailed further below.

The gearbox assembly 46 includes a gear ratio that defines a ratio of the speed of the input gear (e.g., the sun gear 252) to the speed of the output (e.g., the ring gear 256) through the gearbox assembly 46. Embodiments of the present disclosure detailed herein provide for increased gear ratios for a fixed gear envelope (e.g., with the same size ring gear), or alternatively, a smaller diameter ring gear may be used to achieve the same gear ratios. Thus, the embodiments disclosed herein allow for gear ratios suitable for large diameter engines, or for smaller diameter engines. A total gear ratio of the planet gear 254 includes a first gear ratio of the first stage planet gear 260 and a second gear ratio of the second stage planet gear 262. The first gear ratio of the first stage planet gear 260 is less than the second gear ratio of the second stage planet gear 262. In some embodiments, the first gear ratio of the first stage planet gear 260 is greater than or equal to the second gear ratio of the second stage planet gear 262. The total gear ratio of the planet gear 254 is in a range of seven (7:1) to twelve (12:1). The total gear ratio is selected based on engine size and power requirements and a selection of components for a particular gearbox assembly 46. For example, the total gear ratio is based on the speed of the fan 38 (e.g., the tip speed of the fan 38 of FIG. 1) and the speed of the LP turbine 30 (e.g., based on the number of stages of the LP turbine 30 of FIG. 1).

FIG. 3 is a schematic, cross-sectional side view of a planet gear 254 of the gearbox assembly 46, taken along the centerline axis 12 of the engine 10 of FIG. 1, according to an embodiment of the present disclosure. FIG. 3 illustrates a single planet gear 254 isolated from the gearbox assembly 46. FIG. 3 shows the first stage planet gear 260 and the second stage planet gear 262 are supported by a layshaft 302. The layshaft 302 comprises an intermediate portion 304 that supports the first stage planet gear 260 between two outer portions 306. The two outer portions 306 support the second stage planet gear 262. The intermediate portion 304 includes a web comprising an axial portion 308 and a radial portion 310. The axial portion 308 extends in a generally axial direction A at an angle with respect to the axis 13. In this way, the axial portion 308 is sloped with respect to the two outer portions 306. In some embodiments, the axial portion 308 extends substantially axially such that the axial portion 308 is not sloped with respect to the two outer portions 306. The radial portion 310 extends generally in the radial direction R. The layshaft 302 includes an axially forward face 312 and an axially aft face 314. In this way, the layshaft 302 of the planet gear 254 extends axially from the axially forward face 312 to the axially aft face 314. The layshaft 302 includes a layshaft axial length L that is defined from the axially forward face 312 to the axially aft face 314.

The first stage planet gear 260 includes a first rim 361 and the second stage planet gear 262 includes a second rim 363.

The gear teeth of the first stage planet gear 260 extend from the first rim 361 at a root to a tip of the gear teeth. The gear teeth of the second stage planet gear 262 extend from the second rim 363 at a root to a tip of the gear teeth. The second rim 363 includes the radially inner surface 365 that defines the outer race 286, as detailed above.

The second stage planet gear 262 includes a pitch circle 320. The pitch circle 320 is an imaginary circle that corresponds to a point at which each tooth of the gear contacts a corresponding point of the mating gear. A portion of the pitch circle 320 is shown in FIG. 3 for clarity. The pitch circle 320 includes a planet gear pitch diameter $D_p$ that is defined as the diameter of the pitch circle 320.

FIG. 3 shows only two rolling elements 285 with the pin 282 (FIG. 2) removed for clarity. The plurality of rolling elements 285 each includes a rolling element length $L_r$ that is defined as a length (e.g., an axial length) of the respective rolling element 285. The plurality of rolling elements 285 includes a rolling element diameter $D_r$ that is defined as a diameter of the respective rolling element 285. The size and the shape of the rolling elements 285 can be defined as a ratio of the rolling element length to the rolling element diameter, or in other words is defined as $L_r/D_r$, as detailed further below. Further, the one or more roller bearings 284 include a fit with the pin 282. The pin 282 (FIG. 2) is fixed on the planet carrier 280 (FIG. 2) by two interference fits (e.g., at a forward location of the pin 282 and at an aft location of the pin 282). The interference fits of the pin 282 with the planet carrier 280 can be equal or different based on the accessibility and the assembly constraints of the gearbox assembly 46 (FIG. 2).

As mentioned earlier, the inventors sought to improve upon the size and the weight of a power gearbox. With regard to the sizing and weight requirements, consideration was given not simply to those factors affecting the inertial and thermal loading environment such as the size of gears to carry a load, durability, heat dissipation, lubrication requirements, etc., but also the contact pressures of the roller bearings during operation of the power gearbox for a given size of the planet gear. In contrast to existing aircraft engines requiring a power gearbox (e.g., a gearbox that couples a low power shaft to the fan) that either utilizes a relatively low gear ratio or a lower power rating requirement on the gearbox, embodiments considered (high power rating and gear ratio) presented challenges in determining how the gearbox could be reduced in size and weight while still being capable of transferring torque with high efficiency, and to account for the contact pressures of the bearings in a reliable, repeatable manner.

The size of the planet gear is first determined based on the input torque of the gearbox assembly (e.g., a function of the fan speed and the low pressure turbine speed), the total gear ratio of the gearbox assembly, and the critical-to-quality (CTQs) outputs (e.g., efficiency of the gearbox assembly, weight of the gearbox assembly, and geometric envelope of the gearbox assembly). The planet gear size and the roller bearing size effect the factors above. The planet gear size includes a diameter of the first stage planet gear 260 and a diameter of the second stage planet gear 262 (e.g., the gear pitch diameter $D_p$ of the second stage planet gear 262). The factors detailed above are then used to determine the resulting radial load on the roller bearings 284. From the radial load on the roller bearings 284, the roller bearing design is selected. The roller bearing design includes a diameter of the outer race 286 and a size and a shape of the rolling elements 285 of the roller bearings 284. For example, the roller bearing design defines the radial thickness of the second rim 363, and the size and the number of rolling elements 285 based on the deformation of the outer race 286 and the load sharing among the rolling elements 285 of the roller bearings 284 from the radial load on the roller bearings 284. The design of the gearbox assembly thus includes a radial size of the roller bearings for a given gear pitch diameter of the second stage planet gear 262, and an axial size of the layshaft, as detailed further below. Further, the number and the size of the rolling elements impact the contact pressure on the roller bearings due to the anticipated radial loading on the roller bearings. The high contact pressure on the gear, and, therefore, on the roller bearings, may result in significant wearing patterns on the roller bearings (e.g., on the rolling elements 285) and/or on the gear not previously of significance in prior designs for lower powered engines, thereby reducing reliability of the gearbox assembly. Thus, the embodiments herein provide for a size and a number of rolling elements and a size of the roller bearings suited for the specific loading of the gearbox during operation, and not an overdesign that unnecessarily increases the overall size or weight of the gearbox assembly (and the engine) or an under design resulting in wear leading to reduced lifecycle of the roller bearings before repair or maintenance is needed.

During the course of the evaluation of different embodiments as set forth herein with the goal of improving upon the size (e.g., the axial length or radial height) and the weight of a gearbox, the inventors discovered, unexpectedly, that there exists a first relationship among the number $N_r$ of rolling elements 285 in a respective roller bearing 284, the rolling element length $L_r$ of each rolling element 285, and the gear pitch diameter $D_p$ of the second stage planet gear 262, and a second relationship among the rolling element length $L_r$ of each rolling element 285 and the layshaft axial length L of the layshaft 302, which uniquely identify a finite and a readily ascertainable (in view of this disclosure) number of embodiments suitable for a particular architecture that accounts for the contact pressure for maintaining acceptable operation of the roller bearings 284. The discovery enables one to select a number $N_r$ and a size of the rolling elements 285 to reduce or to minimize the axial length of the layshaft 302, thereby reducing the axial length of the gearbox assembly, and, thus, the axial length of the engine, while accounting for the contact pressures on the roller bearings. The permissible number $N_r$ of rolling elements 285 and the rolling element length $L_r$ (e.g., axial length) is found that is suitable for a particular gear pitch diameter $D_p$ of the second stage planet gear 262 that addresses the size and the number of rolling elements 285 to maintain an acceptable value of the contact stress on the rolling elements 285 for operation of the roller bearings 284, thereby avoiding premature wear of the roller bearings 284. This first relationship is referred to as the Bearing radial envelope, in relationship (1):

$$\frac{N_r * L_r}{D_p}$$

where $N_r$ is the number of rolling elements 285 in a respective roller bearing 284, $L_r$ is the rolling element length, and $D_p$ is the gear pitch diameter of the second stage planet gear 262 of the planet gear 254. The second relationship is referred to as the Layshaft axial envelope, in relationship (2):

$$\frac{L}{L_r}$$

where L is the layshaft axial length of the layshaft 302 and $L_r$ is the rolling element length.

As discussed further below, the inventors have identified a range of the bearing radial envelope and a range of the layshaft axial envelope that enable a roller bearing 284 and a planet gear 254, respectively, to be designed for a wide range of engine designs such that the contact stresses on the roller bearing 284 are defined to avoid premature wear on the roller bearing 284 while reducing the axial length and the weight of the gearbox assembly, and, thus, reducing the axial length and the weight of the engine, as compared to gearbox assemblies and engines without the benefit of the present disclosure.

Using these unique relationships, the number and the size of the rolling elements 285, and the layshaft axial length of the layshaft 302 (and the gearbox assembly 46) can be selected for a more compact gearbox assembly 46 that reduces engine size and weight. Additionally, using the bearing radial envelope and the layshaft axial envelope as a guide, the roller bearings 284 and the axial length of the layshaft 302 of the planet gear 254 can be developed early in the design process, while considering the contact pressure on the roller bearings 284, thereby reducing a size of the gearbox assembly and of the engine. Thus, the bearing radial envelope and the layshaft axial envelope detailed herein result in a reduced size and a reduced weight of an engine and, thus, an improved efficiency of the gearbox assembly and improved engine efficiency (e.g., improved efficiency in the conversion of kinetic energy in the fluid stream to mechanical energy in the turbine shaft).

The inventors also desire to arrive at design possibilities at an early stage of design, so that the downstream selection of candidate improved designs, given the tradeoffs, become more predictable. Heretofore, the process has sometimes been more ad hoc, selecting one design or another without knowing the impact when a concept is first taken into consideration. For example, and referring to FIG. 1, various aspects of the fan section 14 design (e.g., fan 38 design, the fan blades 40 design, etc.), the combustion section 26 design, the compressor section 23 design, the turbine section 27 design, etc., may not be known, but such components impact the contact pressure on the roller bearings 284 and the size of the roller bearings 284 (FIG. 2) and the planet gear 254 (FIG. 2) and, thus, may influence the design of the roller bearings 284 and of the planet gear 254.

The bearing radial envelope relationship and the layshaft axial envelope relationship are preferably used for multi-stage gearboxes for aircraft and that have relatively high-power ratings (e.g., greater than 7 megawatts, greater than 15 megawatts, or greater than 22 megawatts) and gear ratios in ranges of seven (7:1) to twelve (12:1). For example, the relationships detailed herein are preferably used in unducted single fan engines with a high-speed, low pressure turbine and variable pitch propellers, and gearbox assemblies with two stage compound symmetrical planet gears.

Table 1 describes exemplary embodiments 1 to 55 identifying the bearing radial envelope and the layshaft axial envelope for various engines with various bearing sizes (e.g., $L_r/D_r$). Embodiments 1 to 55 may represent the engine 10 described with respect to FIG. 1 and can be applied to the gearbox assembly 46 shown in FIGS. 2 and 3. In Table 1, the bearing radial envelope is determined based on the relationship (1) and the layshaft axial envelope is determined based on the relationship (2) described above.

TABLE 1

| Emb. | Gear Pitch Diameter, $D_p$ (mm) | $L_r/D_r$ | Number of Rolling Elements, $N_r$ | Rolling Element Length, $L_r$ (mm) | Layshaft Axial Length, L (mm) | Bearing Radial Envelope $N_r^* L_r/D_p$ | Layshaft Axial Envelope $L/L_r$ |
|---|---|---|---|---|---|---|---|
| 1 | 136.1 | 1.6 | 9 | 35.52 | 191 | 2.349 | 5.38 |
| 2 | 144.2 | 1.6 | 9 | 32.8 | 193 | 2.047 | 5.88 |
| 3 | 145.8 | 1.6 | 9 | 32.32 | 193 | 1.995 | 5.97 |
| 4 | 201.6 | 1.6 | 9 | 46.4 | 280 | 2.071 | 6.03 |
| 5 | 206.8 | 1.6 | 9 | 49.6 | 256 | 2.159 | 5.16 |
| 6 | 213 | 1.6 | 9 | 48.8 | 256 | 2.062 | 5.25 |
| 7 | 217 | 1.6 | 9 | 48.8 | 256 | 2.024 | 5.25 |
| 8 | 348 | 1.6 | 13 | 56 | 398 | 2.092 | 7.11 |
| 9 | 357.6 | 1.6 | 13 | 56.8 | 406 | 2.065 | 7.15 |
| 10 | 136.1 | 1.6 | 16 | 23.21 | 191 | 2.729 | 8.23 |
| 11 | 144.2 | 1.6 | 21 | 19.59 | 193 | 2.853 | 9.85 |
| 12 | 145.8 | 1.6 | 23 | 18.65 | 193 | 2.942 | 10.35 |
| 13 | 201.6 | 1.6 | 20 | 29 | 280 | 2.877 | 9.66 |
| 14 | 206.8 | 1.6 | 19 | 30.72 | 256 | 2.822 | 8.33 |
| 15 | 213 | 1.6 | 20 | 30.21 | 256 | 2.837 | 8.47 |
| 16 | 217 | 1.6 | 20 | 30.77 | 256 | 2.836 | 8.32 |
| 17 | 348 | 1.6 | 24 | 42.07 | 398 | 2.901 | 9.46 |
| 18 | 357.6 | 1.6 | 25 | 41.62 | 406 | 2.910 | 9.76 |
| 19 | 136.1 | 2 | 9 | 38 | 191 | 2.513 | 5.03 |
| 20 | 144.2 | 2 | 9 | 36 | 193 | 2.247 | 5.36 |
| 21 | 145.8 | 2 | 9 | 35.6 | 193 | 2.198 | 5.42 |
| 22 | 201.6 | 2 | 9 | 51.4 | 280 | 2.295 | 5.45 |
| 23 | 206.8 | 2 | 9 | 54 | 256 | 2.350 | 4.74 |
| 24 | 213 | 2 | 9 | 54 | 256 | 2.282 | 4.74 |
| 25 | 217 | 2 | 9 | 54.4 | 256 | 2.256 | 4.71 |
| 26 | 348 | 2 | 13 | 66 | 398 | 2.466 | 6.03 |
| 27 | 357.6 | 2 | 13 | 67 | 406 | 2.436 | 6.06 |
| 28 | 136.1 | 2 | 22 | 22 | 191 | 3.556 | 8.68 |
| 29 | 144.2 | 2 | 27 | 19.55 | 193 | 3.661 | 9.87 |
| 30 | 145.8 | 2 | 29 | 19 | 193 | 3.779 | 10.16 |
| 31 | 201.6 | 2 | 26 | 28.7 | 280 | 3.701 | 9.76 |
| 32 | 206.8 | 2 | 24 | 31.23 | 256 | 3.624 | 8.20 |
| 33 | 213 | 2 | 26 | 29.89 | 256 | 3.649 | 8.57 |
| 34 | 217 | 2 | 26 | 30.44 | 256 | 3.647 | 8.41 |
| 35 | 348 | 2 | 31 | 41.68 | 398 | 3.713 | 9.5 |
| 36 | 357.6 | 2 | 32 | 41.55 | 406 | 3.718 | 9.77 |
| 37 | 144.2 | 1.3 | 9 | 29.25 | 193 | 1.826 | 6.60 |
| 38 | 145.8 | 1.3 | 9 | 28.86 | 193 | 1.781 | 6.69 |
| 39 | 201.6 | 1.3 | 9 | 41.6 | 280 | 1.857 | 6.73 |
| 40 | 206.8 | 1.3 | 9 | 44.2 | 256 | 1.924 | 5.79 |
| 41 | 213 | 1.3 | 9 | 43.68 | 256 | 1.846 | 5.86 |
| 42 | 217 | 1.3 | 9 | 43.68 | 256 | 1.812 | 5.86 |
| 43 | 348 | 1.3 | 16 | 45.5 | 398 | 2.092 | 8.75 |
| 44 | 357.6 | 1.3 | 17 | 44.85 | 406 | 2.132 | 9.05 |
| 45 | 144.2 | 1.3 | 15 | 21.27 | 193 | 2.213 | 9.07 |
| 46 | 145.8 | 1.3 | 17 | 19.74 | 193 | 2.302 | 9.78 |
| 47 | 201.6 | 1.3 | 15 | 30.16 | 280 | 2.244 | 9.28 |
| 48 | 206.8 | 1.3 | 13 | 34.39 | 256 | 2.162 | 7.44 |
| 49 | 213 | 1.3 | 14 | 33.28 | 256 | 2.187 | 7.69 |
| 50 | 217 | 1.3 | 15 | 32 | 256 | 2.212 | 8 |
| 51 | 348 | 1.3 | 18 | 44.03 | 398 | 2.277 | 9.04 |
| 52 | 357.6 | 1.3 | 19 | 43.12 | 406 | 2.291 | 9.42 |
| 53 | 348 | 1 | 12 | 47.5 | 398 | 1.638 | 8.38 |
| 54 | 357.6 | 1 | 12 | 48.8 | 406 | 1.638 | 8.32 |
| 55 | 206.8 | 1.6 | 16 | 35.5 | 256 | 2.747 | 7.21 |

The gear pitch diameter $D_p$ is in a range of one hundred millimeters (100 mm) to four hundred millimeters (400 mm). In some embodiments, the gear pitch diameter $D_p$ is in a range of one hundred thirty-six millimeters (136 mm) to three hundred sixty millimeters (360 mm). The gear pitch diameter $D_p$ of the second stage planet gear 262 is selected based on a balance of the input torque to the gearbox assembly, the total gear ratio of the gearbox assembly, and the efficiency, the weight, and the geometric envelope of the gearbox assembly. A larger gear pitch diameter $D_p$ (e.g., values closer to 400 mm) corresponds to a larger planet gear 254, and, thus, a larger gearbox assembly 46. A smaller gear pitch diameter $D_p$ (e.g., values closer to 100 mm) corresponds to a smaller planet gear 254, and, thus, a smaller gearbox assembly 46. The larger gear pitch diameter $D_p$ is used for larger engines and the larger planet gears are able to withstand a larger radial load on the roller bearings, while the smaller gear pitch diameter $D_p$ is used for smaller engines and the smaller planet gears are able to withstand smaller radial load on the roller bearings as compared to the larger planet gears. For example, the lower end of the range is selected for smaller engines that are used for narrow body aircraft (e.g., single aisle aircraft having a cabin width less than about four meters (4 m)) or regional turboprop aircraft, and the upper end of the ranges is selected for larger engines that are used in widebody aircraft (e.g., twin-aisle aircraft having a cabin width greater than about four meters (4 m)).

The $L_r/D_r$ of the rolling elements 285 is in a range of one (1) to two (2). A greater $L_r/D_r$ indicates longer rolling elements 285 (e.g., greater rolling element length $L_r$) with smaller rolling element diameter $D_r$, and, thus, a smaller gearbox assembly (in the radial direction). A lower $L_r/D_r$ indicates shorter rolling elements 285 (e.g., smaller rolling element length $L_r$) with a greater rolling element diameter $D_r$, and, thus, a larger gearbox assembly (in the radial direction). The diameter of the outer race 286 is selected based on the radial thickness of the second rim 363 and the gear pitch diameter $D_p$ to balance for deformation of the outer race 286 and load sharing among the rolling elements 285. For example, the radial thickness of the second rim 363 is selected for providing proper function of the roller bearings 284, while reducing the weight of the planet gear 254. For example, if the radial thickness of the second rim 363 is too thin, the radial load on the second stage planet gear 262 will deform the second rim 363 such that the roller bearings 284 may not work properly (e.g., the planet gear 254 may be impeded from rotating properly about the pin 282 (FIG. 2)). If the radial thickness of the second rim 363 is too great, the weight of the planet gear 254 increases, thus increasing the weight of the gearbox assembly 46 and reducing engine efficiency of the engine 10.

The number $N_r$ of rolling elements 285 is in a range of nine (9) to thirty-two (32). The number $N_r$ of rolling elements 285 is selected based on the size of the rolling elements 285. For example, as the rolling element diameter $D_r$ decreases ($L_r/D_r$ increases), the number of rolling elements $N_r$ increases, and as the rolling element diameter $D_r$ increases ($L_r/D_r$ decreases), the number of rolling elements $N_r$ decreases. Likewise, as the rolling element length $L_r$ increases ($L_r/D_r$ increases), the number of rolling elements $N_r$ increases, and as the rolling element length $L_r$ decreases ($L_r/D_r$ decreases), the number of rolling elements $N_r$ decreases. Thus, the roller bearings 284 include a greater number $N_r$ of rolling elements 285 when the rolling elements 285 include a smaller rolling element diameter $D_r$ and the roller bearings 284 include a fewer number $N_r$ of rolling elements 285 when the rolling elements 285 include a larger rolling element diameter $D_r$. The rolling element length $L_r$ is in a range of eighteen millimeters (18 mm) to sixty-seven millimeters (67 mm). The rolling element length $L_r$ is selected based on the size of the engine detailed above. For example, the lower end of the range is selected for smaller engines that are used for narrow body aircraft or regional aircraft, and the upper end of the range is selected for larger engines that are used in widebody aircraft. The number $N_r$ and size of the rolling elements 285 is selected to maintain the bearing radial envelope in a range for avoiding premature wear on the roller bearings 284 due to the contact pressure on the roller bearings 284 during operation of the gearbox assembly 46, as detailed further below.

The layshaft axial length L of the layshaft 302 is in a range of one hundred fifty millimeters (150 mm) to four hundred seventy millimeters (470 mm). In one embodiment, the layshaft axial length L of the layshaft 302 is in a range of one hundred ninety-one millimeters (191 mm) to four hundred six millimeters (406 mm). The layshaft axial length L is selected based on a balance between having a shorter axial length, while avoiding premature wear on the roller bearings 284 due to the contact pressures for the given size of the rolling elements 285 (e.g., for a selected rolling element length $L_r$ and number $N_r$ of rolling elements 285). A shorter layshaft axial length L allows for the planet gear 254 to be shorter, which allows the gearbox assembly 46 to be shorter, relative to planet gears and gearbox assemblies without the benefit of the present disclosure. An overall weight of the gearbox assembly 46 is reduced, thereby reducing an overall weight of the engine 10, which leads to improved engine efficiency relative to engines without the benefit of the present disclosure. The layshaft axial length L of the layshaft 302 is selected to maintain the layshaft axial envelope in a range for reducing the wear on the roller bearings 284 due to the contact pressure on the roller bearings 284 during operation of the gearbox assembly 46, while reducing the size of the gearbox assembly 46, as detailed further below.

Figure 4:
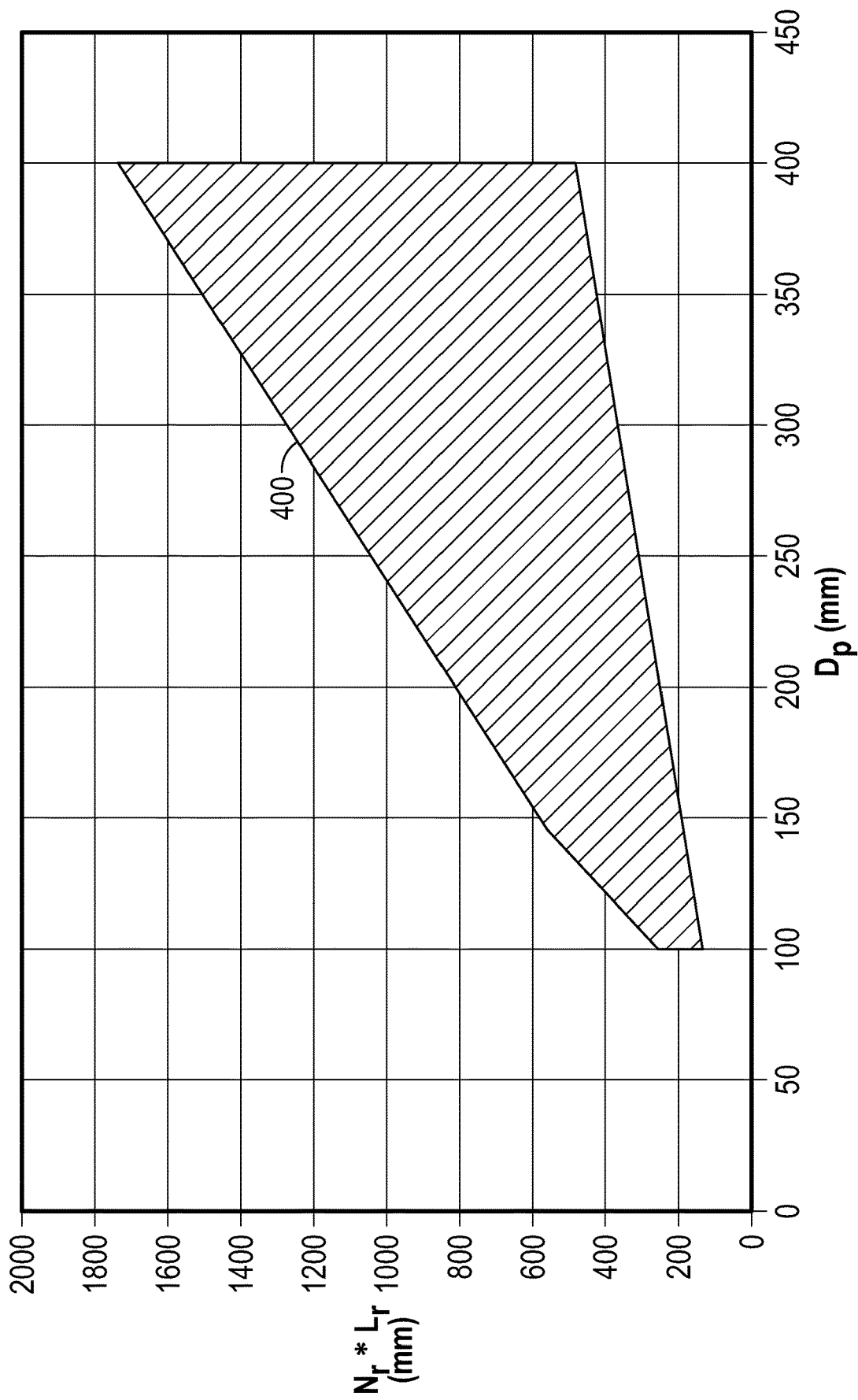
FIG. 4 is a graph illustrating a number of rolling elements of a roller bearing of the planet gear shown in FIGS. 2 and 3 multiplied by a rolling element length as a function of a gear pitch diameter of the planet gear, according to the present disclosure.

FIG. 4 represents, in graph form, the number of rolling elements 285 multiplied by the rolling element length ($N_r*L_r$) as a function of the gear pitch diameter ($D_p$) of the second stage planet gear 262. Table 1 and FIG. 4 show that the number $N_r$ of the rolling elements 285 and/or the rolling element length $L_r$ changes based on the gear pitch diameter $D_p$. An area 400 represents the boundaries of the number $N_r$ of rolling elements 285 multiplied by the rolling element length $L_r$ as a function of the gear pitch diameter $D_p$. The number $N_r$ of rolling elements 285 multiplied by the rolling element length $L_r$ is in a range of one hundred twenty millimeters (120 mm) to one thousand seven hundred and thirty-two millimeters (1732 mm). The gear pitch diameter $D_p$ is in a range of one hundred millimeters (100 mm) to four hundred millimeters (400 mm), as detailed above. FIG. 4 shows that, in general, as the gear pitch diameter $D_p$ increases, the number $N_r$ of rolling elements 285 and/or the rolling element length $L_r$ increases. For example, as the planet gear 254 size increases (e.g., for larger and more powerful engines), the number $N_r$ of rolling elements 285 or the rolling element length $L_r$ needs to be increased to maintain the bearing radial envelope in a range to account for the contact pressure on the roller bearings 284 to avoid premature wear on the roller bearings 284 as compared to gearbox assemblies without the benefit of the present disclosure.

Figure 5:
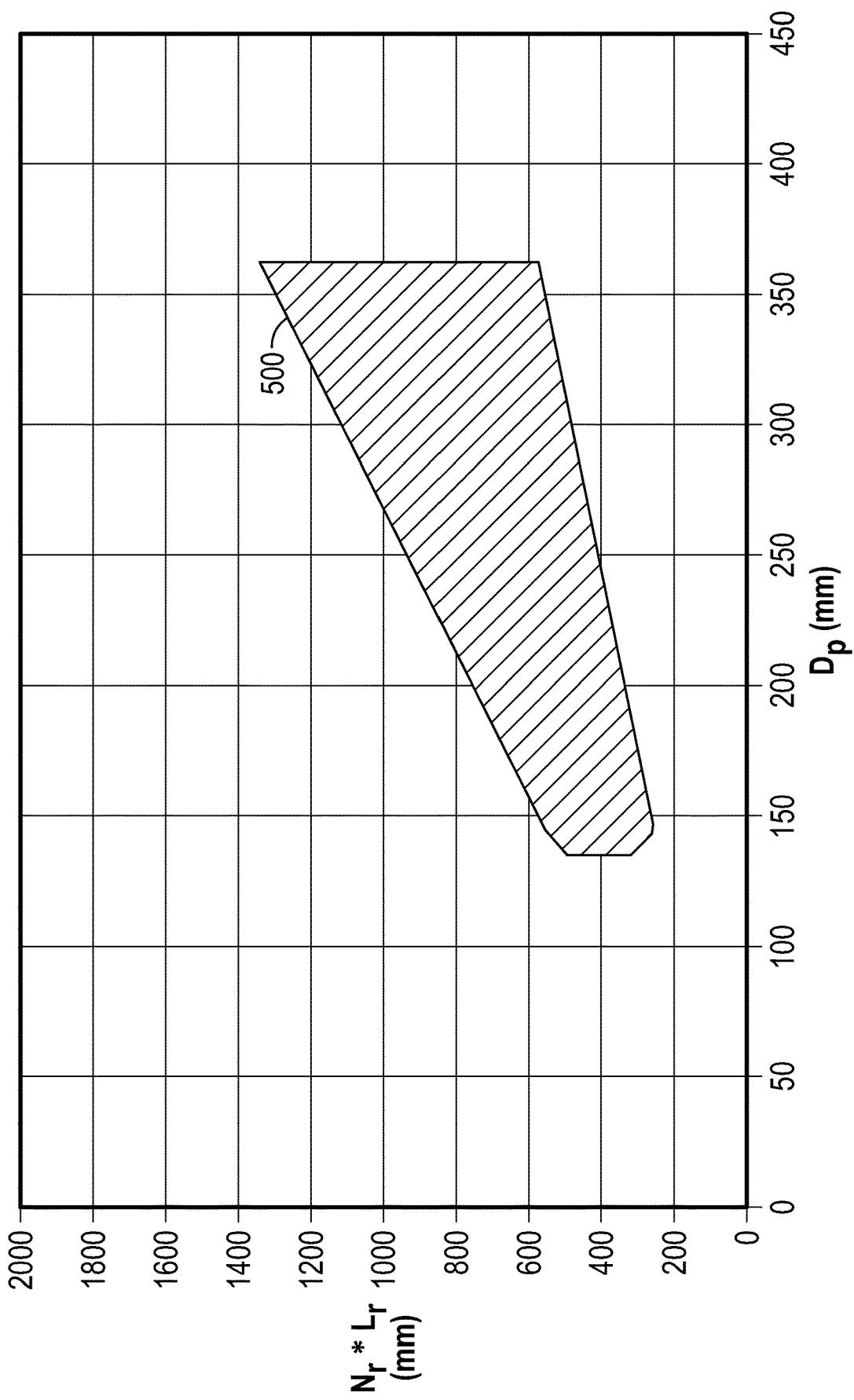
FIG. 5 is a graph illustrating a number of rolling elements of a roller bearing of the planet gear shown in FIGS. 2 and 3 multiplied by a rolling element length as a function of a gear pitch diameter of the planet gear, according to another embodiment.

FIG. 5 represents, in graph form, the number $N_r$ of rolling elements 285 (FIG. 3) multiplied by the rolling element length ($N_r*L_r$) as a function of the gear pitch diameter ($D_p$) of the second stage planet gear 262 (FIG. 3), according to another embodiment. An area 500 represents the boundaries of the number $N_r$ of rolling elements 285 multiplied by the rolling element length $L_r$ as a function of the gear pitch diameter $D_p$. The number $N_r$ of rolling elements 285 multiplied by the rolling element length $L_r$ is in a range of two hundred fifty-nine point seventy-four millimeters (259.74 mm) to one thousand three hundred twenty-nine point six millimeters (1329.6 mm). The gear pitch diameter $D_p$ is in a range of one hundred thirty-six millimeters (136 mm) to three hundred and sixty millimeters (360 mm), as detailed above. The ranges of $N_r*L_r$ and the gear pitch diameter $D_p$ in FIG. 5 are selected for engines for regional and wide body aircraft and the ranges in FIG. 5 are selected for smaller or larger engines.

Figure 6:
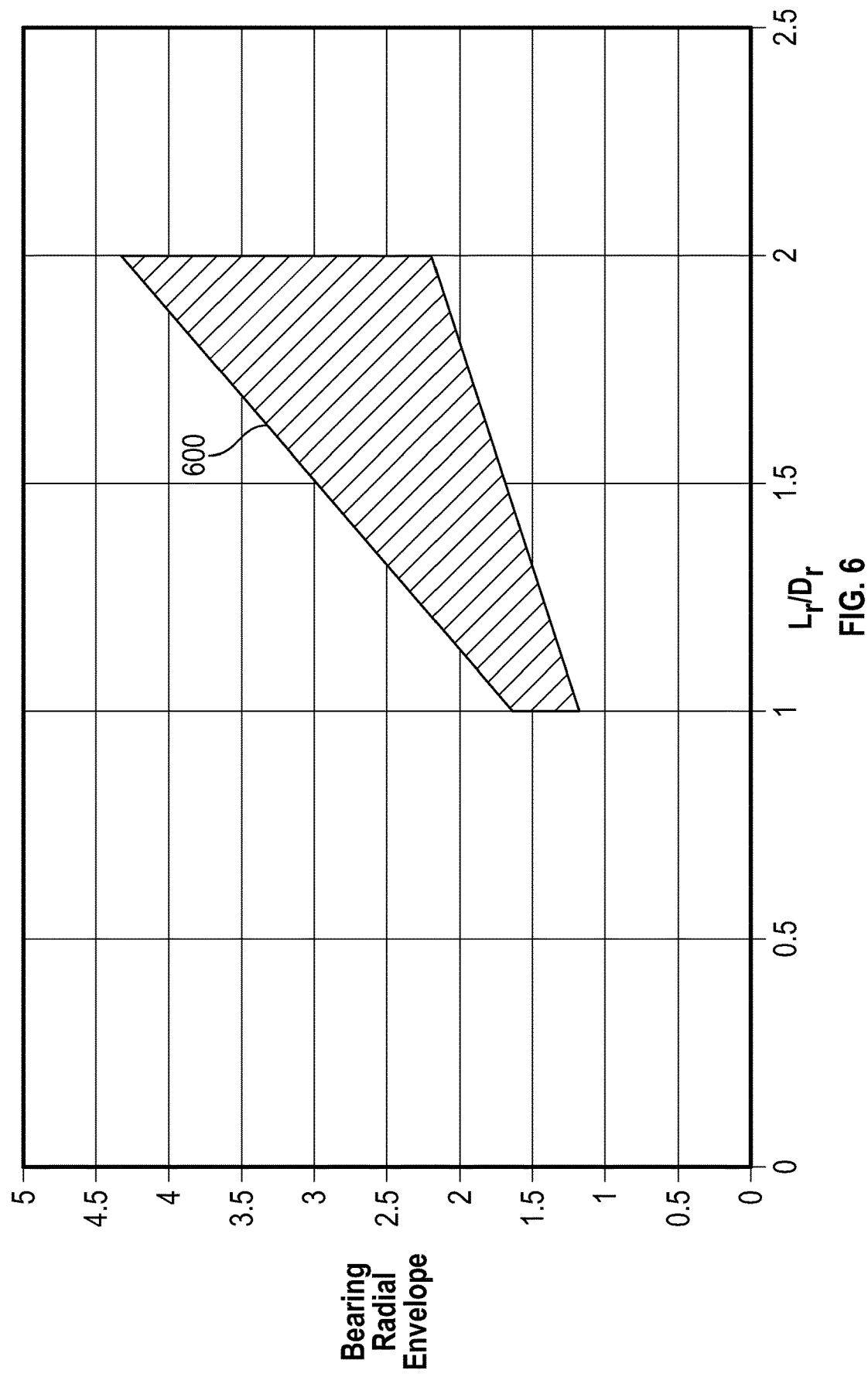
FIG. 6 is a graph illustrating a bearing radial envelope as a function of a size of the rolling elements of the roller bearings of the planet gear shown in FIGS. 2 and 3, according to the present disclosure.

FIG. 6 represents, in graph form, the bearing radial envelope as a function of the size of the rolling elements 285 (FIG. 2) (e.g., a function of $L_r/D_r$). Table 1 and FIG. 6 show that the bearing radial envelope changes based on the $L_r/D_r$ of the rolling elements 285. An area 600 represents the boundaries of the bearing radial envelope as a function of the $L_r/D_r$ of the rolling elements 285. The bearing radial envelope is in a range of one point two (1.2) to four point three two five (4.325). The $L_r/D_r$ of the rolling elements 285 is in a range of one (1) to two (2), as detailed above. FIG. 6 shows that, in general, as the $L_r/D_r$ increases, the bearing radial envelope increases. For example, as the rolling element length $L_r$ increases or the rolling element diameter $D_r$ decreases, the bearing radial envelope increases towards four point three two five (4.325). As the rolling element length $L_r$ decreases or the rolling element diameter $D_r$ increases, the bearing radial envelope decreases towards one point two (1.2). Table 1 depicts several exemplary engines with bearing radial envelopes that satisfy this relationship. For values of the bearing radial envelope outside of the range (e.g., above 4.325 or below 1.2), the roller bearings 284 will be overloaded and will not function properly and/or will wear faster than if the bearing radial envelope is within the range, and, thus, will reduce the lifecycle of the roller bearings 284, and of the gearbox assembly 46. The bearing radial envelope provides a range of the ratio of $N_r*L_r$ to the gear pitch diameter $D_p$ that ensures the roller bearings 284 can sustain the contact pressure (e.g., from the radial load) on the roller bearings 284 while avoiding premature wear on the roller bearings 284 and reducing the size and the weight of the gearbox assembly 46, and, thus, the size and the weight of the engine 10, as compared to gearbox assemblies and engines without the benefit of the present disclosure.

Figure 7:
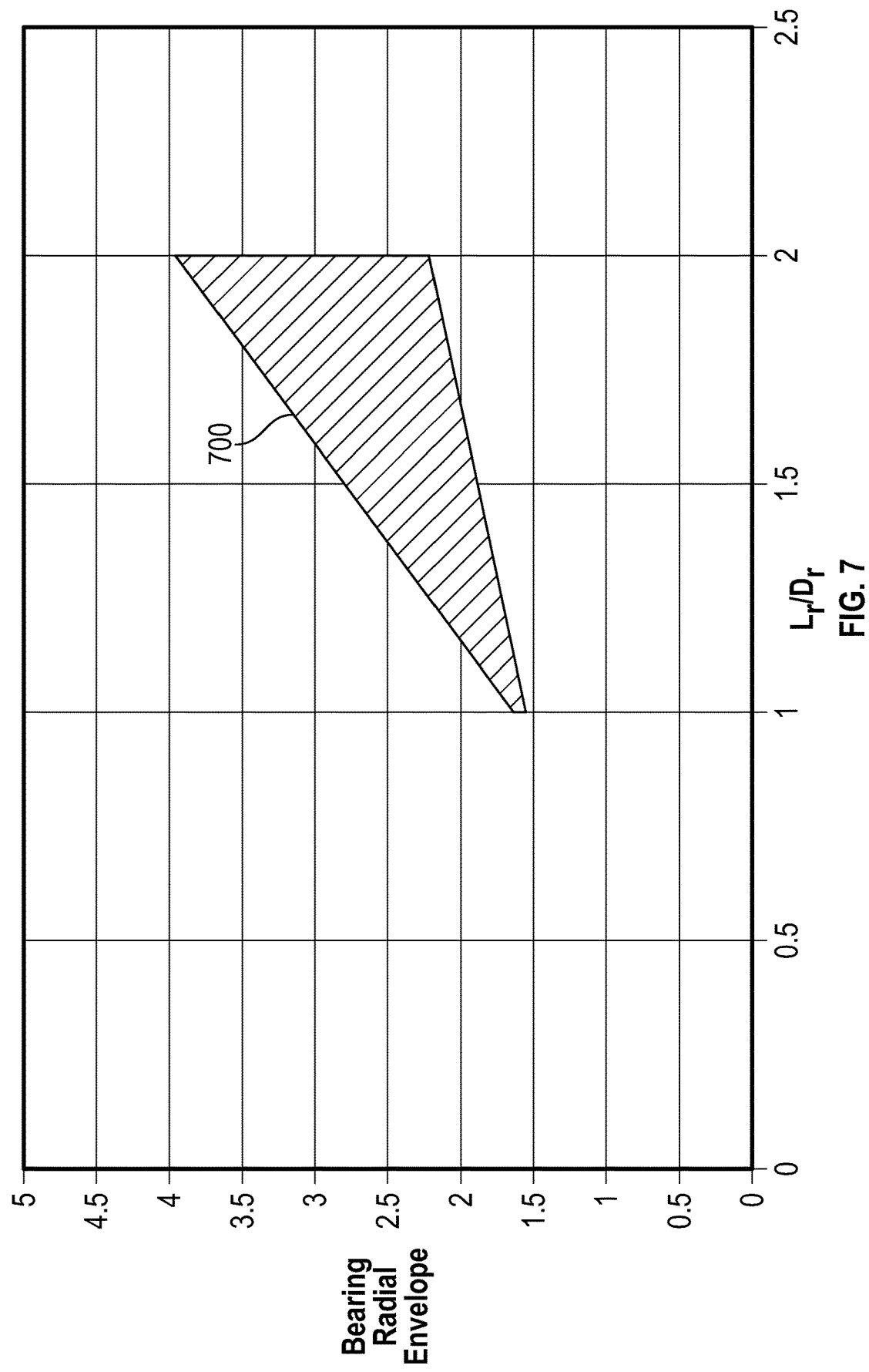
FIG. 7 is a graph illustrating a bearing radial envelope as a function of a size of the rolling elements of the roller bearings of the planet gear shown in FIGS. 2 and 3, according to another embodiment.

FIG. 7 represents, in graph form, the bearing radial envelope as a function of the size of the rolling elements 285 (FIG. 2) (e.g., a function of $L_r/D_r$), according to another embodiment. An area 700 represents the boundaries of the bearing radial envelope as a function of the $L_r/D_r$ of the rolling elements 285. The bearing radial envelope is in a range of one point five seven five (1.575) to three point nine five (3.95). The $L_r/D_r$ of the rolling elements 285 is in a range of one (1) to two (2), as detailed above. The range of the bearing radial envelope in FIG. 7 is selected for engines for regional and wide body aircraft and the range in FIG. 6 is selected for smaller or larger engines.

Figure 8:
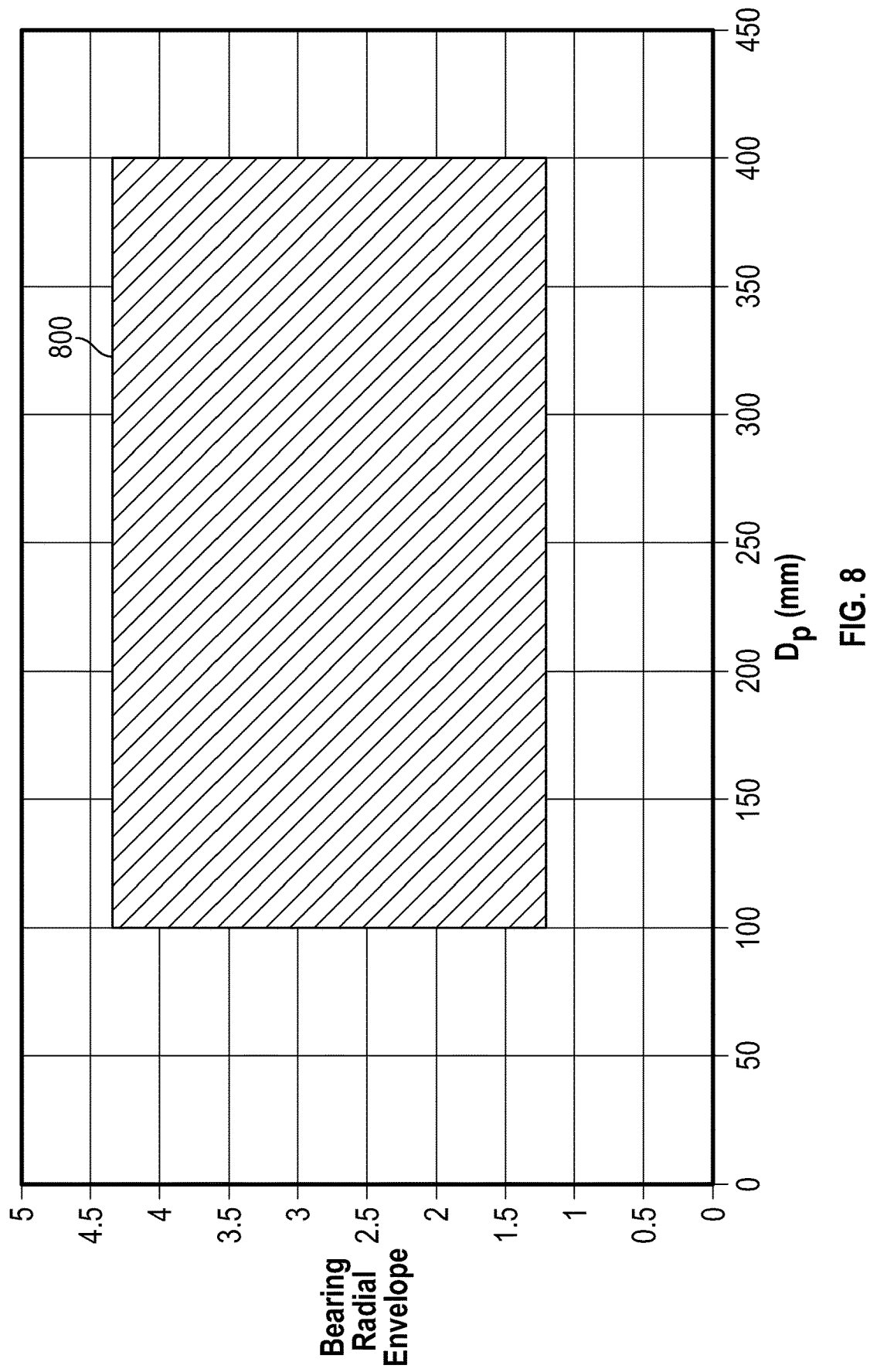
FIG. 8 is a graph illustrating a bearing radial envelope as a function of the gear pitch diameter of the planet gear shown in FIGS. 2 and 3, according to the present disclosure.

FIG. 8 represents, in graph form, the bearing radial envelope as a function of the gear pitch diameter $D_p$. Table 1 and FIG. 8 show that the bearing radial envelope changes based on the gear pitch diameter $D_p$. An area 800 represents the boundaries of the bearing radial envelope as a function of the gear pitch diameter $D_p$. The bearing radial envelope is in a range of one point two (1.2) to four point three two five (4.325). The gear pitch diameter $D_p$ is in a range of one hundred millimeters (100 mm) to four hundred millimeters (400 mm), as detailed above. In general, as the gear pitch diameter $D_p$ increases, the bearing radial envelope decreases, and as the gear pitch diameter $D_p$ decreases, the bearing radial envelope increases. For example, as the gear pitch diameter $D_p$ increases, the bearing radial envelope decreases towards one point two (1.2), and as the gear pitch diameter $D_p$ decreases, the bearing radial envelope increases towards four point three two five (4.325). Table 1 depicts several exemplary engines with bearing radial envelopes that satisfy this relationship. The bearing radial envelope provides a range of the ratio of $N_r*L_r$ to the gear pitch diameter $D_p$ that ensures the roller bearings 284 can sustain the contact pressure (e.g., from the radial load) on the roller bearings 284 while avoiding premature wear on the roller bearings 284, as detailed above.

Figure 9:
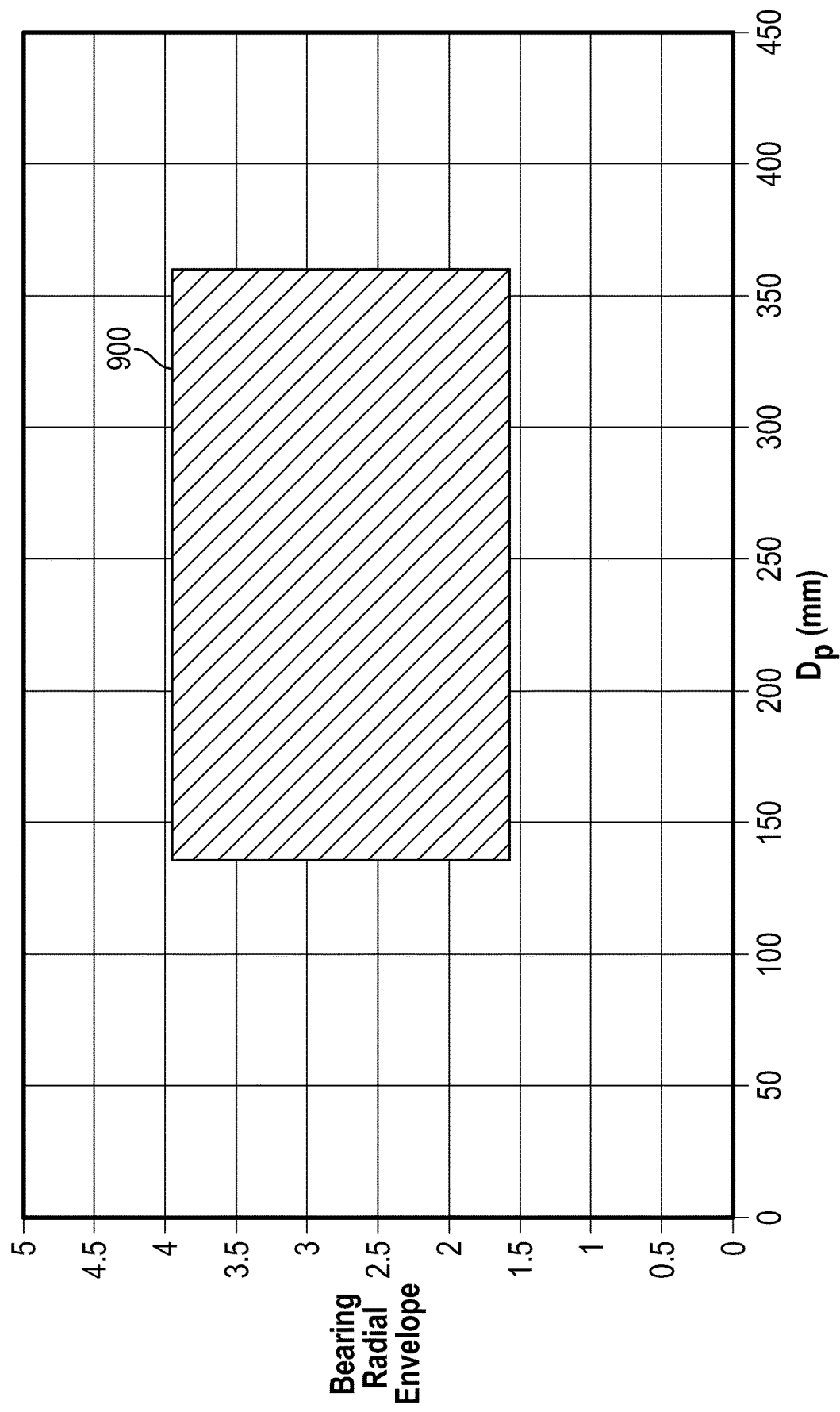
FIG. 9 is a graph illustrating a bearing radial envelope as a function of the gear pitch diameter of the planet gear shown in FIGS. 2 and 3, according to another embodiment.

FIG. 9 represents, in graph form, the bearing radial envelope as a function of the gear pitch diameter $D_p$, according to another embodiment. An area 900 represents the boundaries of the bearing radial envelope as a function of the gear pitch diameter $D_p$. The bearing radial envelope is in a range of one point five seven five (1.575) to three point nine five (3.95). The gear pitch diameter $D_p$ is in a range of one hundred thirty-six millimeters (136 mm) to three hundred sixty millimeters (360 mm), as detailed above. The range of the bearing radial envelope in FIG. 9 is selected for engines for regional and wide body aircraft and the range in FIG. 8 is selected for smaller or larger engines.

Figure 10:
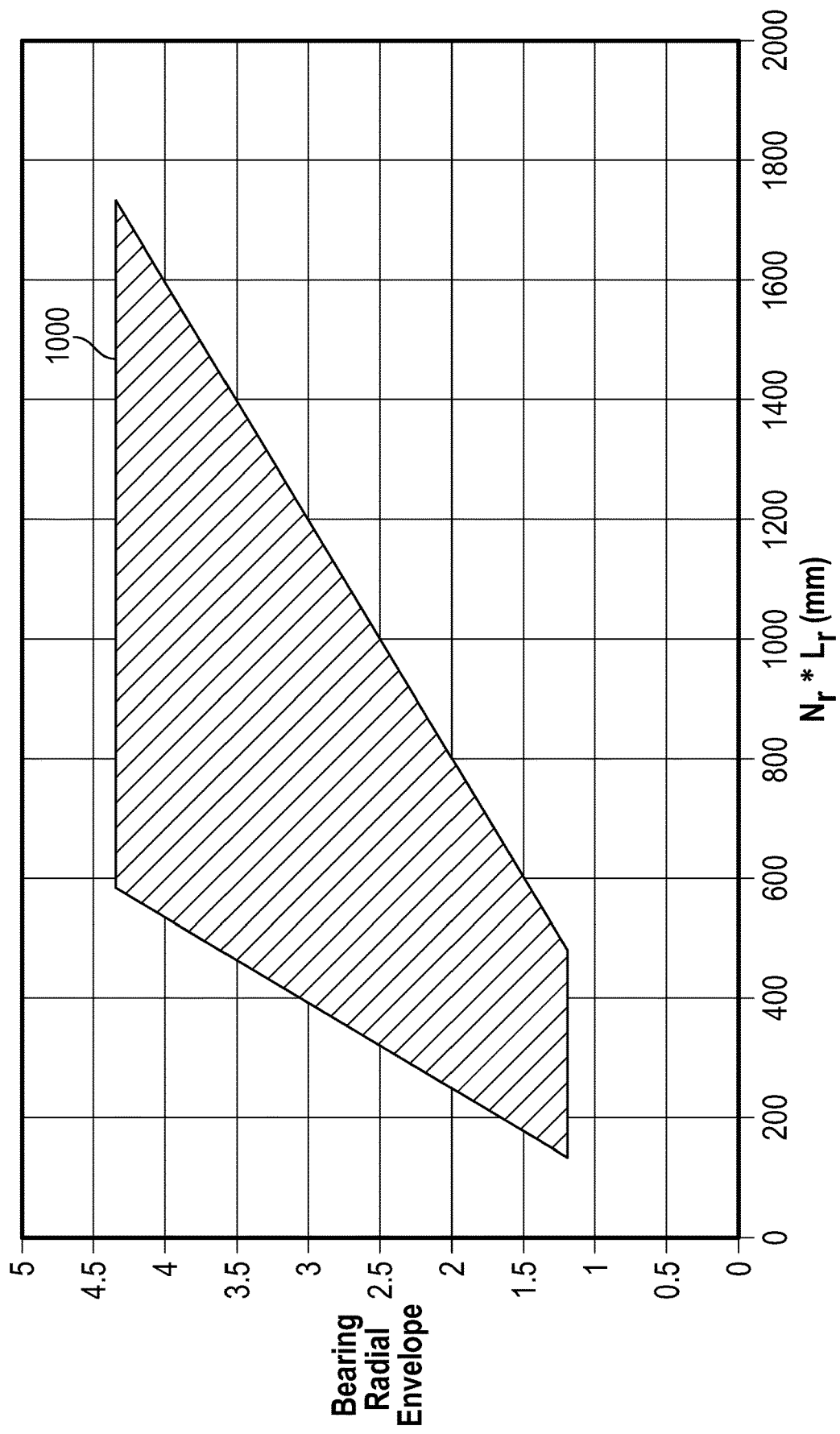
FIG. 10 is a graph illustrating a bearing radial envelope as a function of a number of rolling elements of a roller bearing of the planet gear shown in FIGS. 2 and 3 multiplied by a rolling element length, according to the present disclosure.

FIG. 10 represents, in graph form, the bearing radial envelope as a function of the number of roller bearings $N_r$ multiplied by the rolling element length $L_r$. Table 1 and FIG. 10 show that the bearing radial envelope changes based on $N_r*L_r$. An area 1000 represents the boundaries of the bearing radial envelope as a function of $N_r*L_r$. The bearing radial envelope is in a range of one point two (1.2) to four point three two five (4.325). $N_r*L_r$ is in a range of one hundred twenty millimeters (120 mm) to one thousand seven hundred and thirty two millimeters (1732 mm), as detailed above. In general, as $N_r*L_r$ increases, the bearing radial envelope increases, and as $N_r*L_r$ decreases, the bearing radial envelope decreases. For example, as the number $N_r$ of rolling elements 285 or the rolling element length $L_r$ increases, the bearing radial envelope increases towards four point three two five (4.325), and as the number $N_r$ of rolling elements 285 or the rolling element length $L_r$ decreases, the bearing radial envelope decreases towards one point two (1.2). Table 1 depicts several exemplary engines with bearing radial envelopes that satisfy this relationship. The bearing radial envelope provides a range of the ratio of $N_r*L_r$ to the gear pitch diameter $D_p$ that ensures the roller bearings 284 can sustain the contact pressure (e.g., from the radial load) on the roller bearings 284 while avoiding premature wear on the roller bearings 284, as detailed above.

Figure 11:
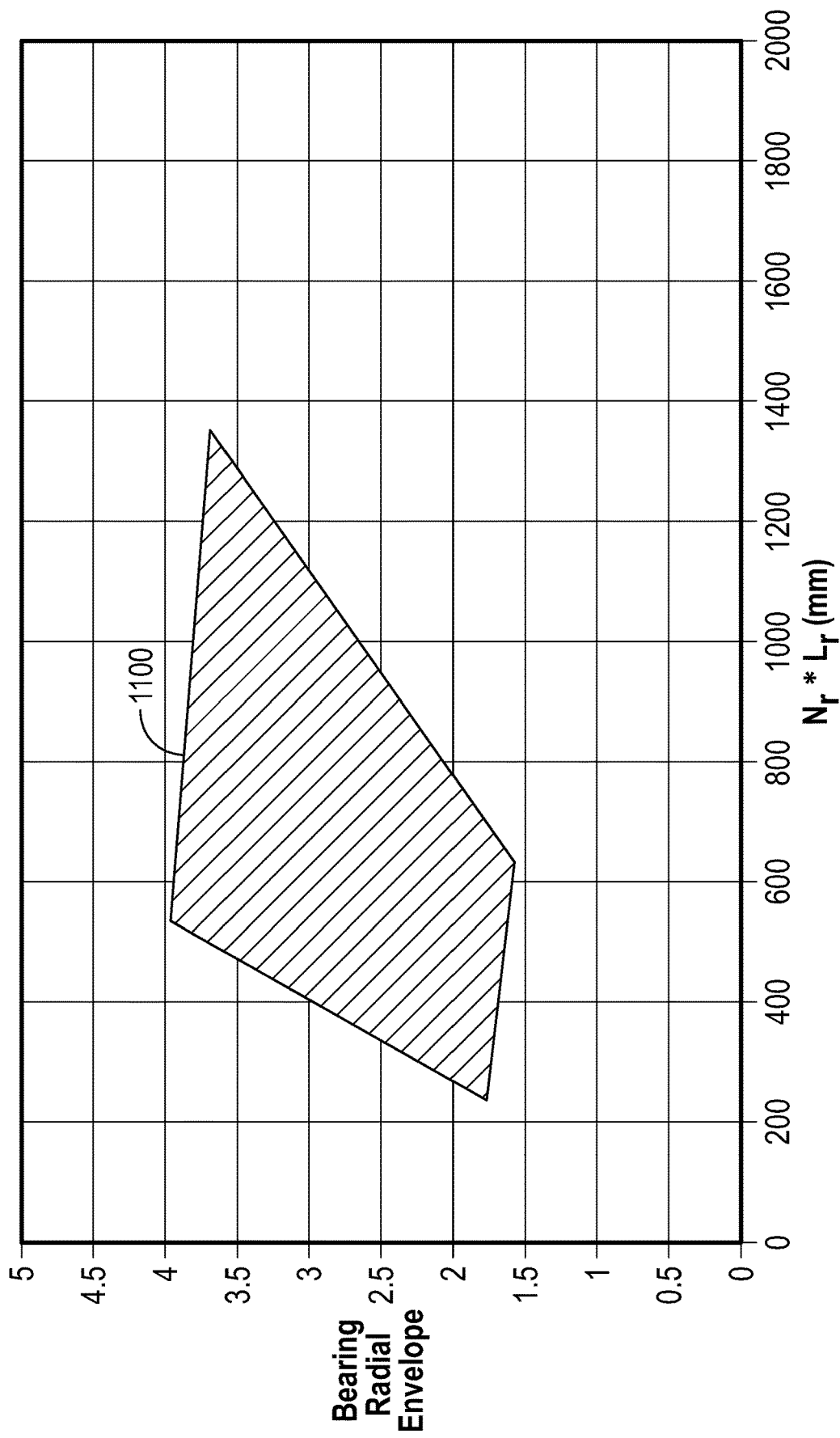
FIG. 11 is a graph illustrating a bearing radial envelope as a function of a number of rolling elements of a roller bearing of the planet gear shown in FIGS. 2 and 3 multiplied by a rolling element length, according to another embodiment.

FIG. 11 represents, in graph form, the bearing radial envelope as a function of the number of roller bearings $N_r$ multiplied by the rolling element length $L_r$, according to another embodiment. An area 1100 represents the boundaries of the bearing radial envelope as a function of $N_r*L_r$. The bearing radial envelope is in a range of one point five seven five (1.575) to three point nine five (3.95). $N_r*L_r$ is in a range of two hundred fifty-nine point seventy-four millimeters (259.74 mm) to one thousand three hundred twenty-nine point six millimeters (1329.6 mm), as detailed above. The range of the bearing radial envelope in FIG. 11 is selected for engines for regional and wide body aircraft and the range in FIG. 10 is selected for smaller or larger engines.

Figure 12:
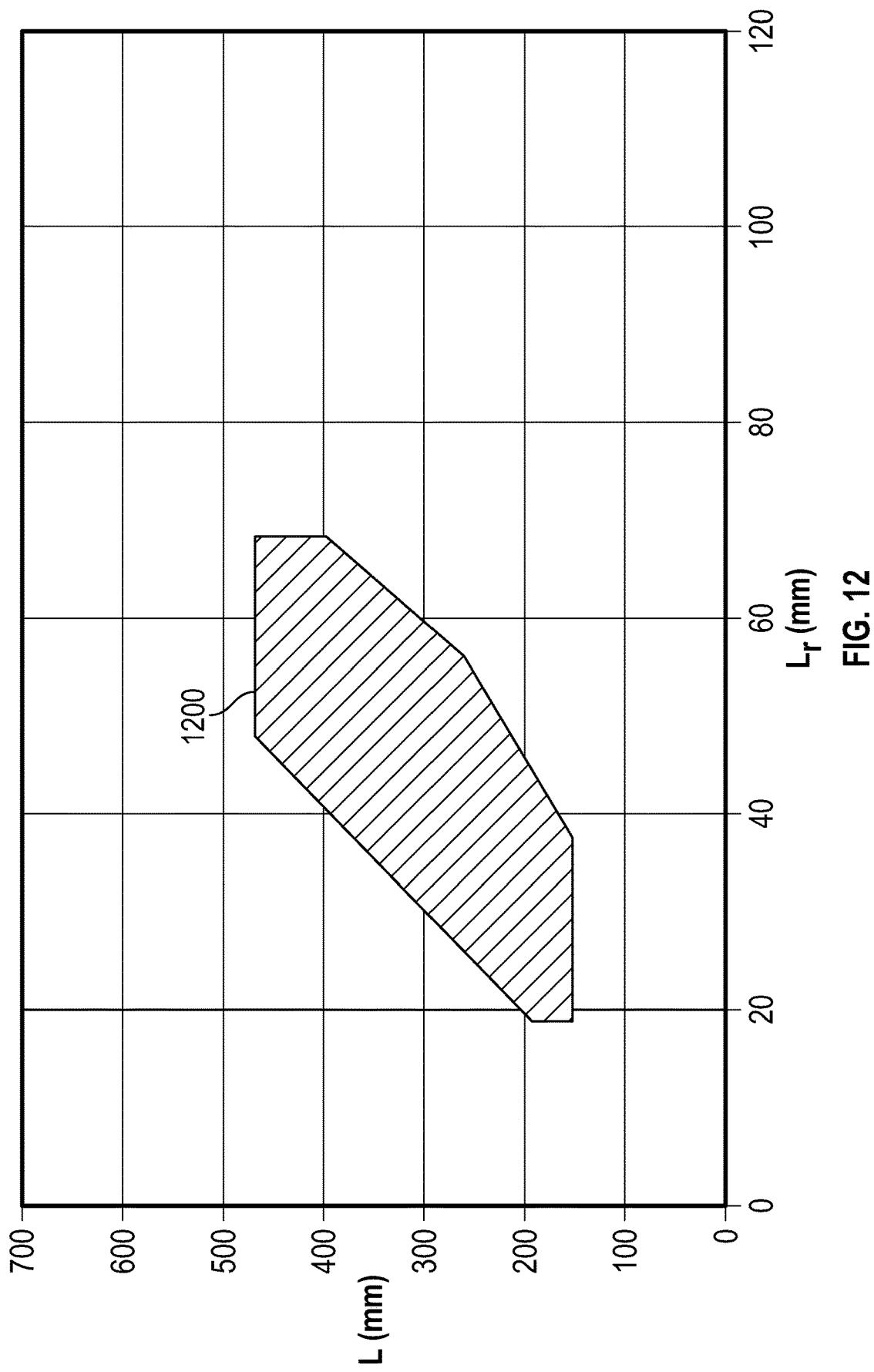
FIG. 12 is a graph illustrating a length of a layshaft of the planet gear shown in FIGS. 2 and 3 as a function of a rolling element length of the roller bearings of the planet gear shown in FIGS. 2 and 3, according to the present disclosure.

FIG. 12 represents, in graph form, the layshaft axial length L of the layshaft 302 (FIG. 3) as a function of the rolling element length $L_r$ (FIG. 3). Table 1 and FIG. 12 show that the layshaft axial length L changes based on the rolling element length $L_r$. An area 1200 represents the boundaries of the layshaft axial length L as a function of the rolling element length $L_r$. The layshaft axial length L is in a range of one hundred fifty millimeters (150 mm) to four hundred seventy millimeters (470 mm). The rolling element length $L_r$ is in a range of eighteen millimeters (18 mm) to sixty-seven millimeters (67 mm), as detailed above. FIG. 8 shows that, in general, as the rolling element length $L_r$ increases, the layshaft axial length L increases. For example, as the planet gear 254 size increases (e.g., for larger and more powerful engines), the size of the rolling elements 285 increase and the layshaft axial length L needs to be increased to maintain the layshaft axial envelope in a range to account for the contact pressure on the roller bearings 284 to reduce the wear on the roller bearings 284 as compared to gearbox assemblies without the benefit of the present disclosure.

Figure 13:
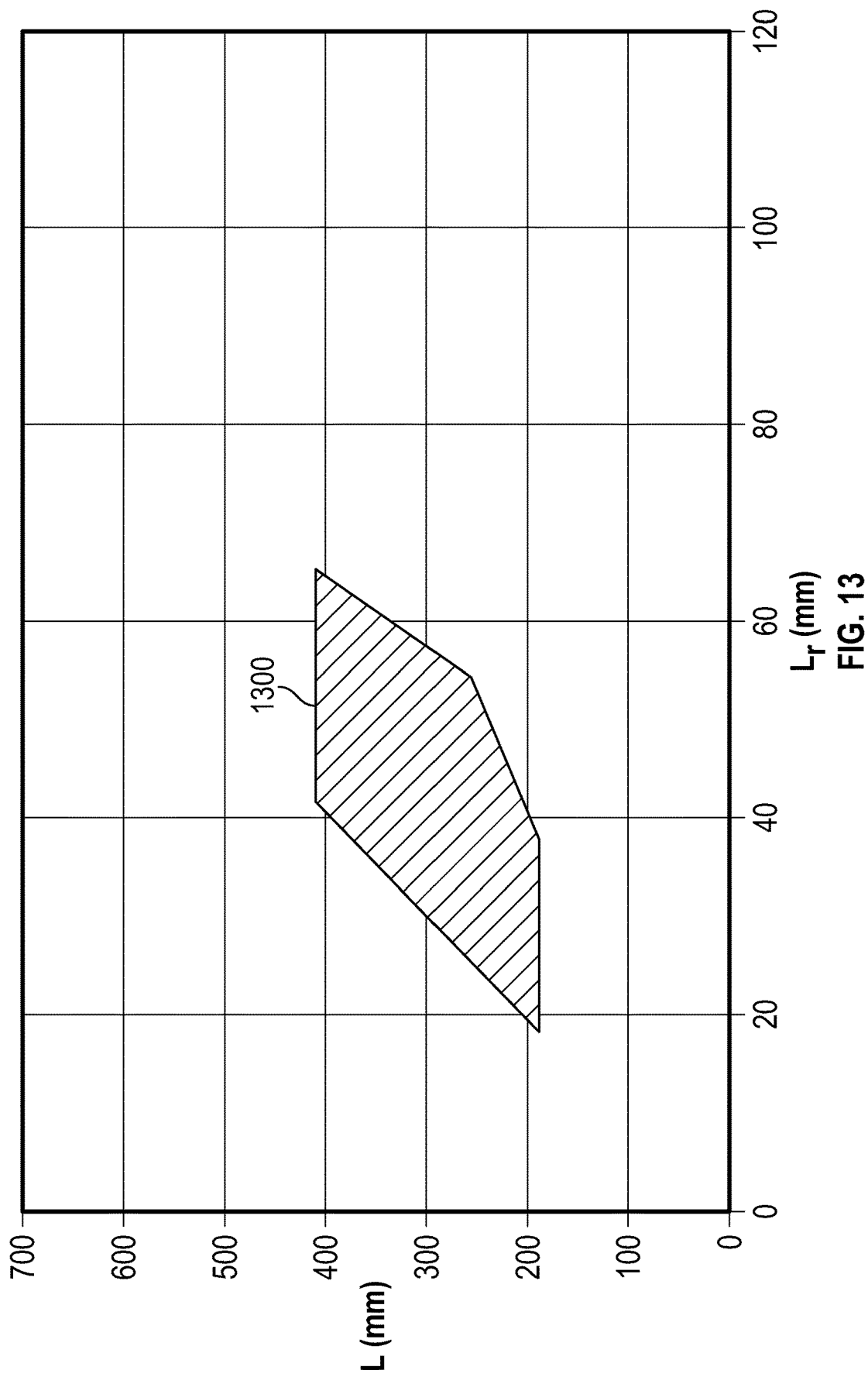
FIG. 13 is a graph illustrating a length of a layshaft of the planet gear shown in FIGS. 2 and 3 as a function of a rolling element length of the roller bearings of the planet gear shown in FIGS. 2 and 3, according to another embodiment.

FIG. 13 represents, in graph form, the layshaft axial length L (FIG. 3) as a function of the rolling element length $L_r$ (FIG. 3), according to another embodiment. An area 1300 represents the boundaries of the layshaft axial length L as a function of the rolling element length $L_r$. The layshaft axial length L is in a range of one hundred ninety-one millimeters (191 mm) to four hundred and six millimeters (406 mm). The rolling element length $L_r$ is in a range of eighteen millimeters (18 mm) to sixty-seven millimeters (67 mm), as detailed above. The range of L and $L_r$ in FIG. 13 are selected for engines for regional and wide body aircraft and the range in FIG. 12 is selected for smaller or larger engines.

Figure 14:
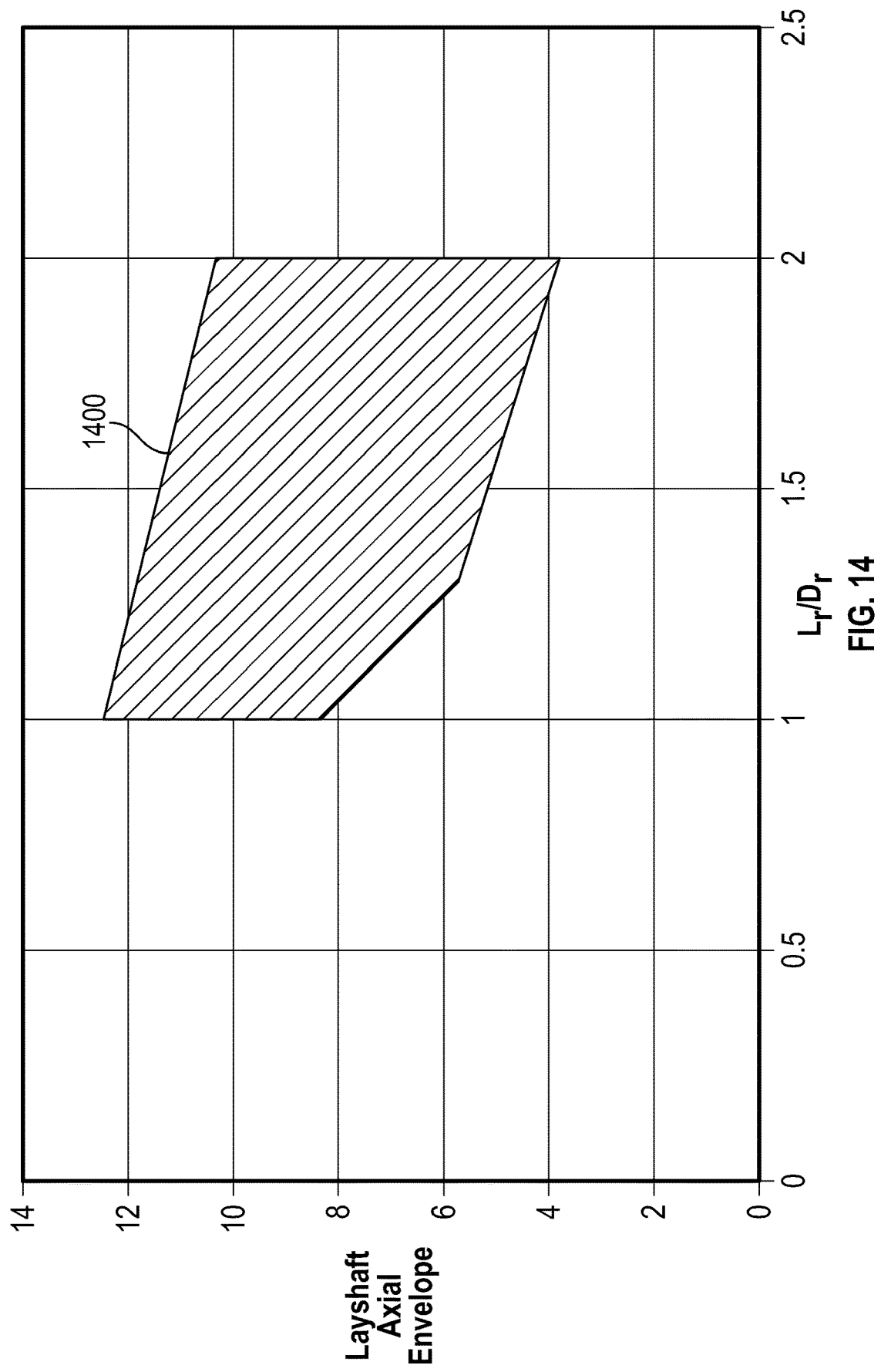
FIG. 14 is a graph illustrating a layshaft axial envelope as a function of a size of the rolling elements of the roller bearings of the planet gear shown in FIGS. 2 and 3, according to the present disclosure.

FIG. 14 represents, in graph form, the layshaft axial envelope as a function of the size of the rolling elements 285 (FIG. 2) (e.g., a function of $L_r/D_r$). Table 1 and FIG. 10 show that the layshaft axial envelope changes based on the $L_r/D_r$ of the rolling elements 285. An area 1400 represents the boundaries of the layshaft axial envelope as a function of the $L_r/D_r$ of the rolling elements 285. The layshaft axial envelope is in a range of three point eight (3.8) to twelve point five (12.5). The $L_r/D_r$ of the rolling elements 285 is in a range of one (1) to two (2), as detailed above. FIG. 14 shows that, in general, as the $L_r/D_r$ increases, the layshaft axial envelope decreases. For example, as the rolling element length $L_r$ increases or the rolling element diameter $D_r$ decreases, the layshaft axial envelope decreases towards three point eight. As the rolling element length $L_r$ decreases or the rolling element diameter $D_r$ increases, the layshaft axial envelope increases to twelve point five. Table 1 depicts several exemplary engines with layshaft axial envelopes that satisfy this relationship. For values of the layshaft axial envelope outside of the range (e.g., above 12.5 or below 3.8), the roller bearings 284 will be overloaded and will not function properly and/or will wear faster than if the layshaft axial envelope is within the range, and, thus, will reduce the lifecycle of the roller bearings 284, and of the gearbox assembly 46. The layshaft axial envelope provides a range of the ratio of the layshaft axial length L to the rolling element length $L_r$ that ensures the roller bearings 284 can sustain the contact pressure (e.g., from the radial load) on the roller bearings 284 while avoiding premature wear on the roller bearings 284 and reducing the size and the weight of the gearbox assembly 46, and, thus, the engine 10, as compared to gearbox assemblies and engines without the benefit of the present disclosure.

Figure 15:
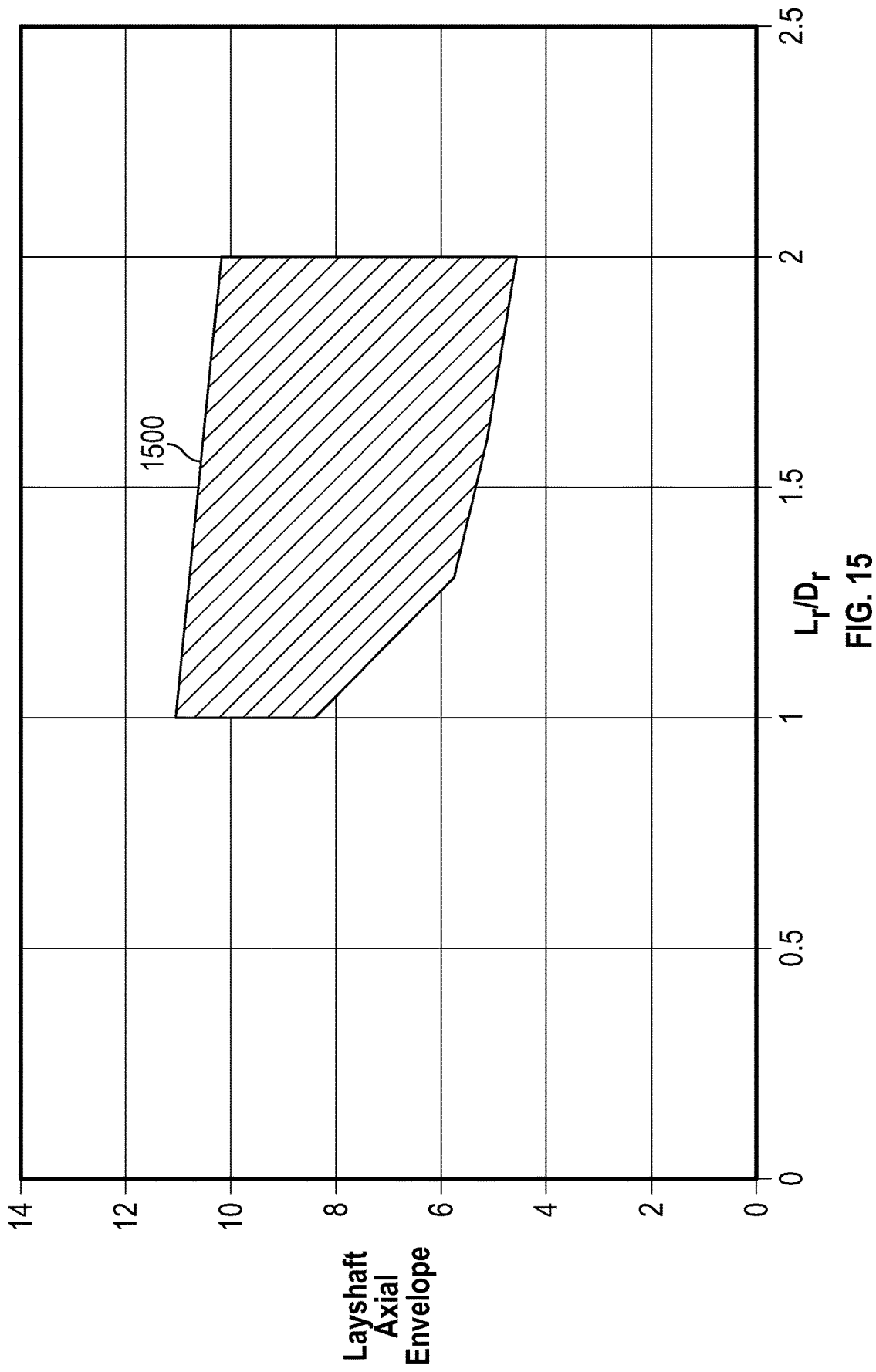
FIG. 15 is a graph illustrating a layshaft axial envelope as a function of a size of the rolling elements of the roller bearings of the planet gear shown in FIGS. 2 and 3, according to another embodiment.

FIG. 15 represents, in graph form, the layshaft axial envelope as a function of the size of the rolling elements 285 (FIG. 2) (e.g., a function of $L_r/D_r$), according to another embodiment. An area 1500 represents the boundaries of the layshaft axial envelope as a function of the $L_r/D_r$ of the rolling elements 285. The layshaft axial envelope is in a range of four point six (4.6) to eleven (11). The $L_r/D_r$ of the rolling elements 285 is in a range of one (1) to two (2), as detailed above. The range of the layshaft axial envelope in FIG. 15 is selected for engines for regional and wide body aircraft (e.g., the narrow ranges) and the range in FIG. 14 is selected for smaller or larger engines (e.g., the broader range).

Figure 16:
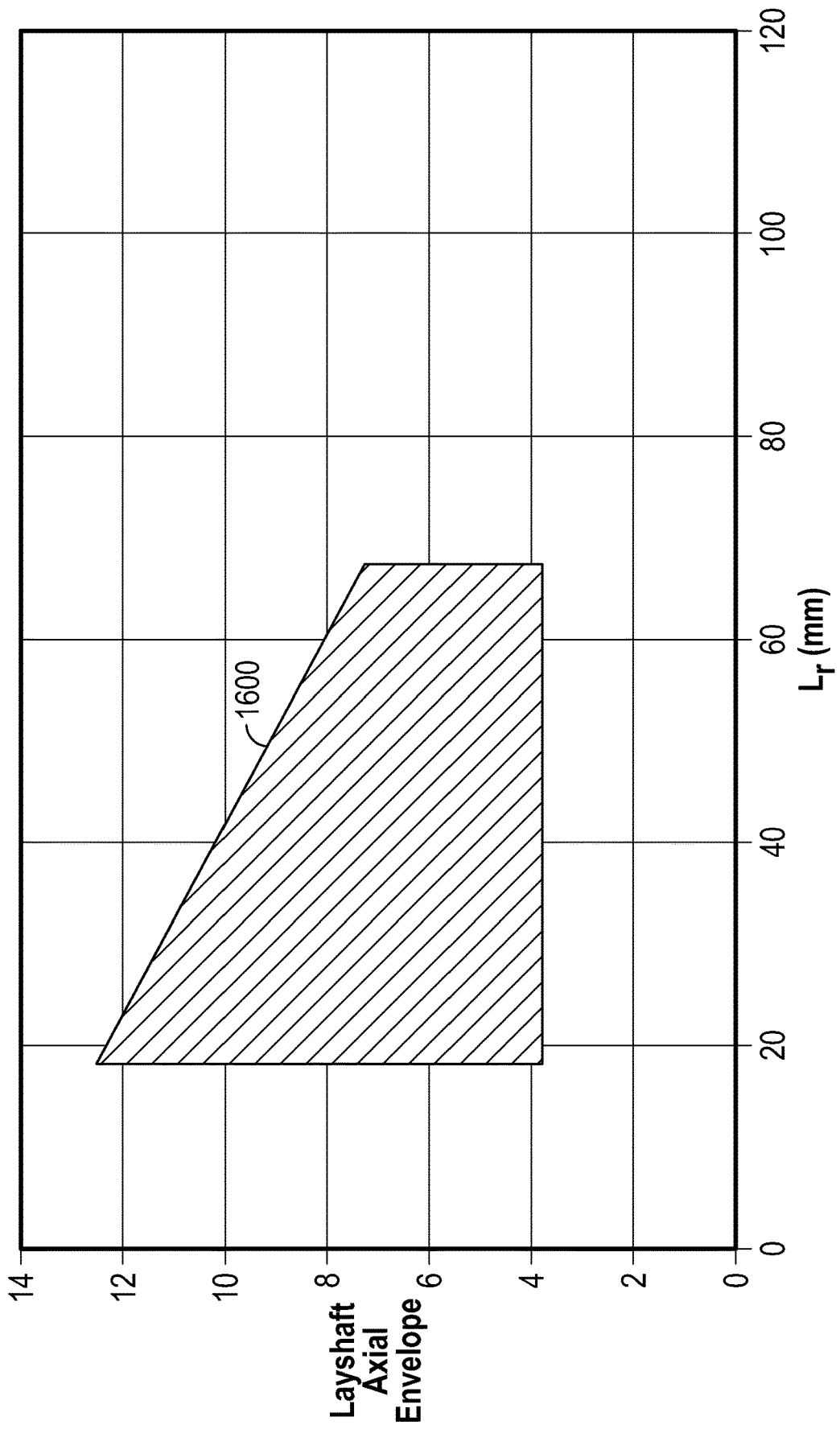
FIG. 16 is a graph illustrating a layshaft axial envelope as a function of the rolling element length of the planet gear shown in FIGS. 2 and 3, according to the present disclosure.

FIG. 16 represent, in graph form, the layshaft axial envelope as a function of the rolling element length $L_r$. Table 1 and FIG. 16 show that the layshaft axial envelope changes based on the rolling element length $L_r$. An area 1600 represents the boundaries of the layshaft axial envelope as a function of the rolling element length $L_r$. The layshaft axial envelope is in a range of three point eight (3.8) to twelve point five (12.5). The rolling element length $L_r$ is in a range of eighteen millimeters (18 mm) to sixty-seven millimeters (67 mm). In general, as the rolling element length $L_r$ increases, the layshaft axial envelope decreases, and as the rolling element length $L_r$ decreases, the layshaft axial envelope increases. For example, as the rolling element length $L_r$ increases, the layshaft axial envelope decreases to three point eight (3.8), and as the rolling element length $L_r$ decreases, the layshaft axial envelope increases to twelve point five (12.5). Table 1 depicts several exemplary engines with layshaft axial envelopes that satisfy this relationship. The layshaft axial envelope provides a range that ensures the roller bearings 284 can sustain the contact pressure (e.g., from the radial load) on the roller bearings 284 while avoiding premature wear on the roller bearings 284, as detailed above.

Figure 17:
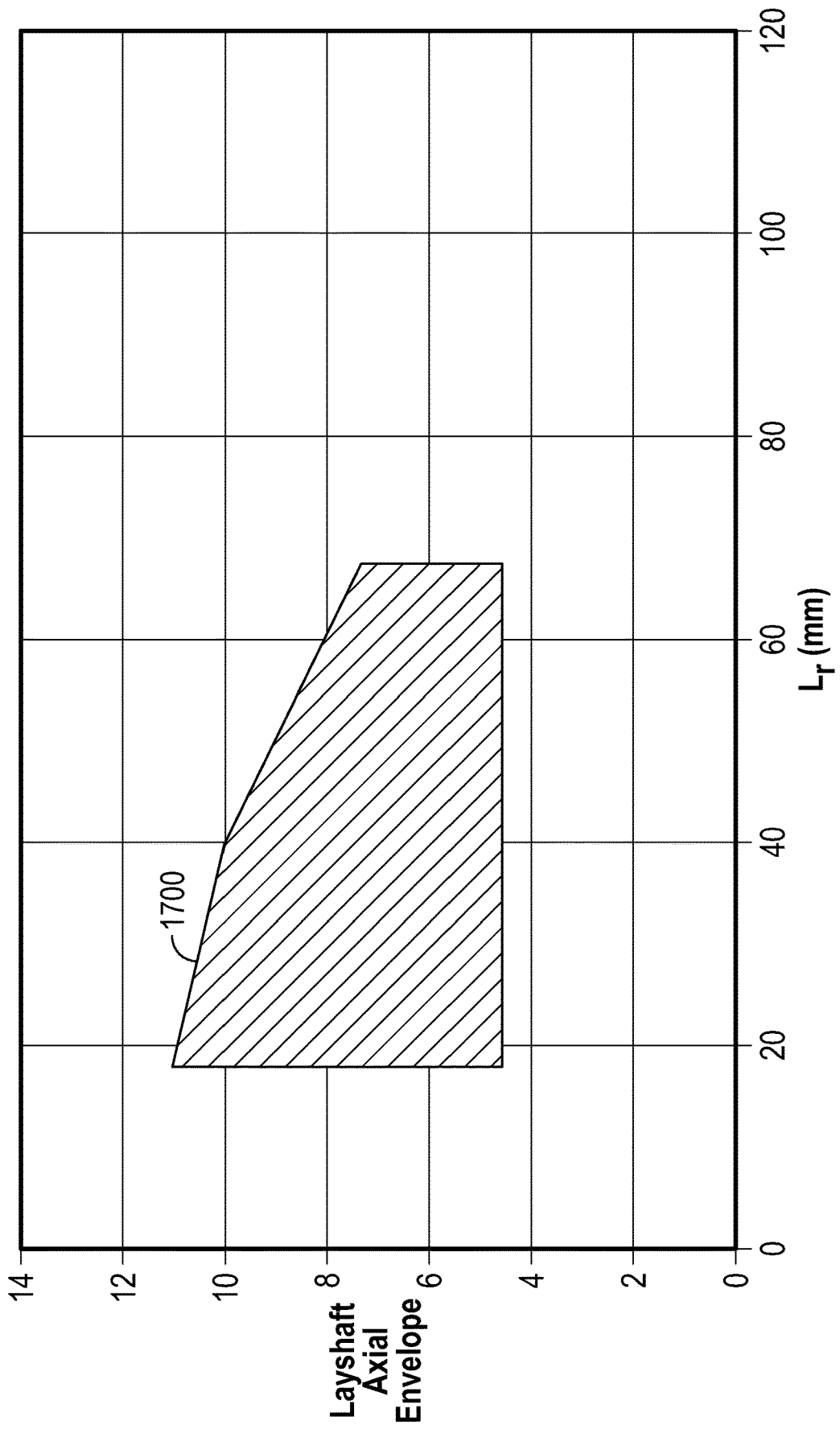
FIG. 17 is a graph illustrating a layshaft axial envelope as a function of the rolling element length of the planet gear shown in FIGS. 2 and 3, according to another embodiment.

FIG. 17 represent, in graph form, the layshaft axial envelope as a function of the rolling element length $L_r$, according to another embodiment. An area 1700 represents the boundaries of the layshaft axial envelope as a function of the rolling element length $L_r$. The layshaft axial envelope is in a range of four point six (4.6) to eleven (11). The rolling element length $L_r$ is in a range of eighteen millimeters (18 mm) to sixty-seven millimeters (67 mm). The range of the layshaft axial envelope in FIG. 17 is selected for engines for regional and wide body aircraft and the range in FIG. 16 is selected for smaller or larger engines.

Figure 18:
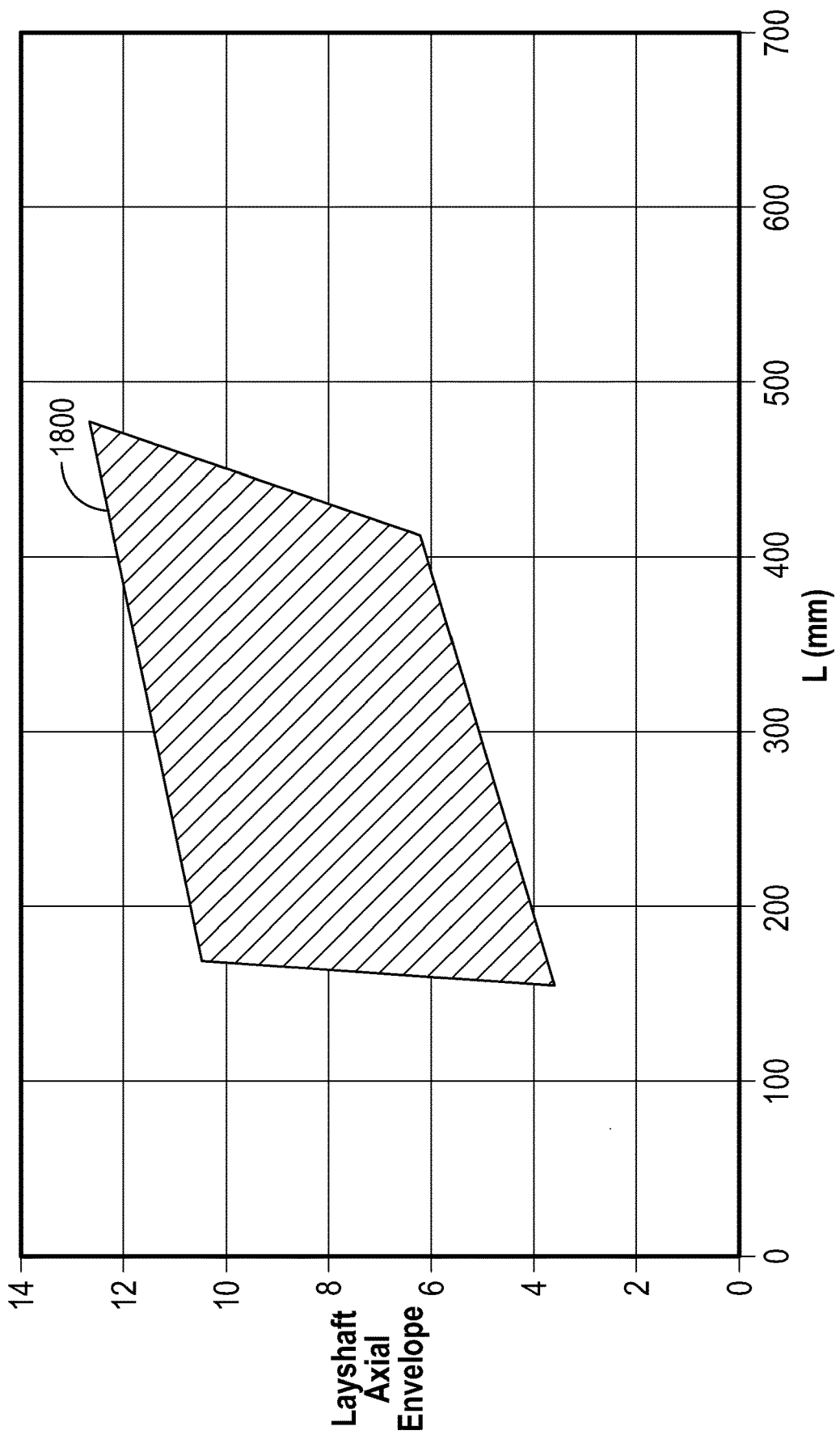
FIG. 18 is a graph illustrating a layshaft axial envelope as a function of the layshaft axial length of the planet gear shown in FIGS. 2 and 3, according to the present disclosure.

FIG. 18 represent, in graph form, the layshaft axial envelope as a function of the layshaft axial length L. Table 1 and FIG. 18 show that the layshaft axial envelope changes based on the layshaft axial length L of the layshaft 302. An area 1800 represents the boundaries of the layshaft axial envelope as a function of layshaft axial length L. The layshaft axial envelope is in a range of three point eight (3.8) to twelve point five (12.5). The layshaft axial length L is in a range of one hundred fifty millimeters (150 mm) to four hundred seventy millimeters (470 mm). In general, as the layshaft axial length L increases, the layshaft axial envelope increases, and as the layshaft axial length L decreases, the layshaft axial envelope decreases. For example, as the layshaft axial length L increases, the layshaft axial envelope increases to twelve point five (12.5), and as the layshaft axial length L decreases, the layshaft axial envelope decreases to three point eight (3.8). Table 1 depicts several exemplary engines with layshaft axial envelopes that satisfy this relationship. The layshaft axial envelope provides a range that ensures the roller bearings 284 can sustain the contact pressure (e.g., from the radial load) on the roller bearings 284 while avoiding premature wear on the roller bearings 284, as detailed above.

Figure 19:
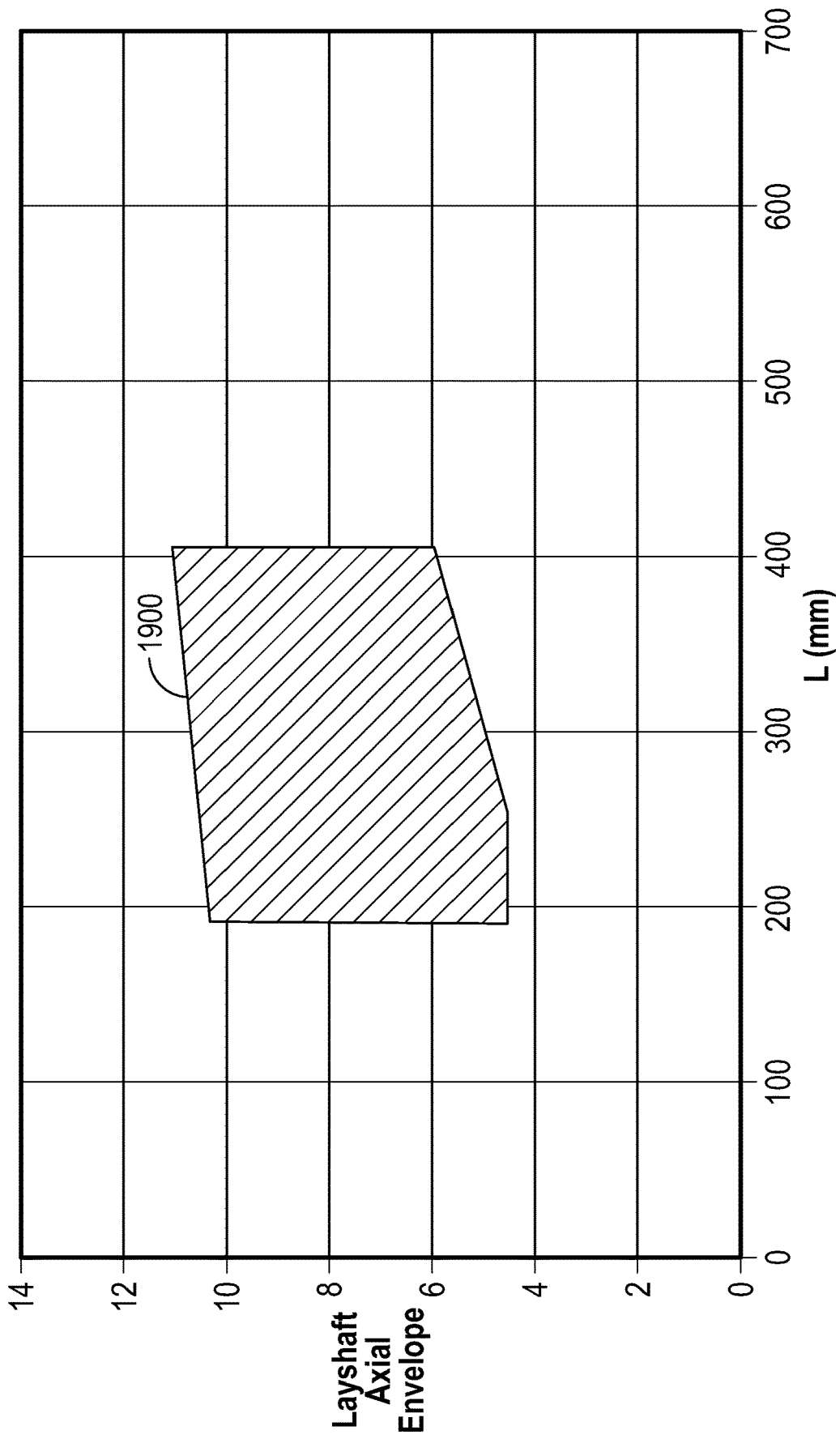
FIG. 19 is a graph illustrating a layshaft axial envelope as a function of the layshaft axial length of the planet gear shown in FIGS. 2 and 3, according to another embodiment.

FIG. 19 represent, in graph form, the layshaft axial envelope as a function of the layshaft axial length L, according to another embodiment. An area 1900 represents the boundaries of the layshaft axial envelope as a function of the layshaft axial length L. The layshaft axial envelope is in a range of four point six (4.6) to eleven (11). The layshaft axial length L is in a range of one hundred ninety-one millimeters (191 mm) to four hundred and six millimeters (406 mm). The range of the layshaft axial envelope in FIG. 19 is selected for engines for regional and wide body aircraft (e.g., the narrow ranges) and the range in FIG. 18 is selected for smaller or larger engines (e.g., the broader range).

The embodiments of the present disclosure detailed herein may be used for an unducted single fan (USF) engine architecture with a high-speed low-pressure turbine and a variable pitch propeller or fan. Such engines provide for a high power rating (e.g., greater than 7 megawatts). In such high power engines, however, a high gear ratio is needed to drive the propeller at the required speed and torque. For example, the gear ratio of the power gearbox between the low pressure turbine and the propeller can be in a range of 7:1 to 12:1. Further, the compound planet gears can reduce the speed from the low pressure turbine to the propeller to the required level and provide advantageous engine integration. The bearings of the present disclosures feature an outer race positioned inside a rim of a layshaft of the planet gears, thereby enabling the engine architecture described herein. The embodiments of the present disclosure provide for a bearing sized to adequately withstand the contact pressures described above while being within the geometrical constrains of the gears of the power gearbox. Accordingly, the relationships detailed herein allow for bearings that are sized to account for the contact pressures on the bearings, while also reducing the size and weight of the gearbox assembly and the overall size, weight, and efficiency of the engine.

Further aspects are provided by the subject matter of the following clauses.

A gearbox assembly comprises a plurality of planet gears, at least one planet gear of the plurality of planet gears including a layshaft, one or more roller bearings disposed within the layshaft and including a plurality of rolling elements, and a bearing radial envelope in a range of 1.2 to 4.325, the bearing radial envelope being equal to $$\frac{N_r * L_r}{D_p}$$

$N_r$ being a number of rolling elements in a respective bearing, $L_r$ is a rolling element length of the plurality of rolling elements, and $D_p$ is a gear pitch diameter of the at least one planet gear.

The gearbox assembly of the preceding clause, the bearing radial envelope being in a range of 1.575 to 3.95.

The gearbox assembly of any preceding clause, a ratio of the rolling element length $L_r$ and a rolling element diameter $D_r$ of the plurality of rolling elements being in a range of 1 to 2.

The gearbox assembly of any preceding clause, $N_r$ being in a range of 9 to 32.

The gearbox assembly of any preceding clause, $L_r$ being in a range of 18 mm to 67 mm.

The gearbox assembly of any preceding clause, $D_p$ being in a range of 100 mm to 400 mm.

The gearbox assembly of any preceding clause, $N_r * L_r$ being in a range of 120 mm to 1732 mm.

The gearbox assembly of any preceding clause, the one or more roller bearings including a first roller bearing and a second roller bearing, and a distance between the first roller bearing and the second roller bearing is in a range of 159 mm to 311 mm.

The gearbox assembly of any preceding clause, the layshaft supporting a first stage planet gear and a second stage planet gear of the at least one planet gear.

The gearbox assembly of any preceding clause, the one or more roller bearings including an outer race defined by a radially inner surface of the at least one planet gear.

The gearbox assembly of any preceding clause, further including a layshaft axial envelope in a range of 3.8 to 12.5, the layshaft axial envelope being equal to $$\frac{L}{L_r}$$

L being a layshaft axial length of the layshaft and $L_r$ is the rolling element length of the plurality of rolling elements.

The gearbox assembly of any preceding clause, the layshaft axial envelope being in a range of 4.6 to 11.

The gearbox assembly of any preceding clause, L being in a range of 150 mm to 470 mm.

The gearbox assembly of any preceding clause, $N_r * L_r$ being in a range of 259.74 mm to 1329.6 mm.

The gearbox assembly of any preceding clause, L being in a range of 191 mm to 406 mm.

The gearbox assembly of any preceding clause, $D_p$ being in a range of 136 mm to 360 mm.

The gearbox assembly of any preceding clause, the one or more roller bearings being disposed within the second stage planet gear.

The gearbox assembly of any preceding clause, the at least one planet gear including a rim, and the outer race being integral with the rim such that the one or more roller bearings are disposed within the rim.

The gearbox assembly of any preceding clause, the layshaft axial length being defined from an axially forward face of the at least one planet gear to an axially aft face of the at least one planet gear.

The gearbox assembly of any preceding clause, the gear pitch diameter $D_p$ being defined as a diameter of a pitch circle of the at least one planet gear.

The gearbox assembly of any preceding clause, further comprising a gear ratio in a range of 7:1 to 12:1.

The gearbox assembly of any preceding clause, the one or more roller bearings including a first roller bearing and a second roller bearing, the second bearing located aft of the first bearing.

The gearbox assembly of any preceding clause, further comprising a sun gear and a ring gear, the sun gear being coupled to a low pressure turbine shaft of an engine, and the ring gear being coupled to a fan shaft of the engine.

The gearbox assembly of any preceding clause, further comprising a sun gear and a ring gear, the sun gear being coupled to a low pressure turbine shaft of an engine, and the plurality of planet gears being coupled to a fan shaft of the engine.

The gearbox assembly of any preceding clause, a power rating of the engine being greater than 7 megawatts, greater than 15 megawatts, or greater than 22 megawatts.

The gearbox assembly of any preceding clause, the engine being an unducted single fan engine.

A gearbox assembly comprises a plurality of planet gears, at least one planet gear of the plurality of planet gears including a layshaft, one or more roller bearings disposed within the layshaft and including a plurality of rolling elements, and a layshaft axial envelope in a range of 3.8 to 12.5, the layshaft axial envelope being equal to $$\frac{L}{L_r}$$

L being a layshaft axial length of the layshaft and $L_r$ is a rolling element length of the plurality of rolling elements.

The gearbox assembly of the preceding clause, the layshaft axial envelope being in a range of 4.6 to 11.

The gearbox assembly of any preceding clause, L being in a range of 150 mm to 470 mm.

The gearbox assembly of any preceding clause, $L_r$ being in a range of 18 mm to 67 mm.

The gearbox assembly of any preceding clause, the one or more roller bearings including a first roller bearing and a second roller bearing, and a distance between the first roller bearing and the second roller bearing is in a range of 159 mm to 311 mm.

The gearbox assembly of any preceding clause, the layshaft supporting a first stage planet gear and a second stage planet gear of the at least one planet gear.

The gearbox assembly of any preceding clause, the one or more roller bearings including an outer race defined by a radially inner surface of the at least one planet gear.

The gearbox assembly of any preceding clause, L being in a range of 191 mm to 406 mm.

The gearbox assembly of any preceding clause, the layshaft supporting a first stage planet gear and a second stage planet gear of the at least one planet gear.

The gearbox assembly of any preceding clause, the one or more roller bearings including an outer race defined by a radially inner surface of the at least one planet gear.

The gearbox assembly of any preceding clause, further comprising a bearing radial envelope in a range of 1.2 to 4.325, the bearing radial envelope being equal to $$\frac{N_r * L_r}{D_p}$$

$N_r$ being a number of rolling elements in a respective bearing, $L_r$ is a rolling element length of the plurality of rolling elements, and $D_p$ is a gear pitch diameter of the at least one planet gear.

The gearbox assembly of any preceding clause, the bearing radial envelope being in a range of 1.575 to 3.95.

The gearbox assembly of any preceding clause, a ratio of the rolling element length $L_r$ and a rolling element diameter $D_r$ of the plurality of rolling elements being in a range of 1 to 2.

The gearbox assembly of any preceding clause, $N_r$ being in a range of 9 to 32.

The gearbox assembly of any preceding clause, $D_p$ being in a range of 100 mm to 400 mm.

The gearbox assembly of any preceding clause, $N_r * L_r$ being in a range of 120 mm to 1732 mm.

The gearbox assembly of any preceding clause, $N_r * L_r$ being in a range of 259.74 mm to 1329.6 mm.

The gearbox assembly of any preceding clause, the one or more roller bearings being disposed within the second stage planet gear.

The gearbox assembly of any preceding clause, the at least one planet gear including a rim, and the outer race being integral with the rim such that the one or more roller bearings are disposed within the rim.

The gearbox assembly of any preceding clause, the layshaft axial length being defined from an axially forward face of the at least one planet gear to an axially aft face of the at least one planet gear.

The gearbox assembly of any preceding clause, the gear pitch diameter $D_p$ being defined as a diameter of a pitch circle of the at least one planet gear.

The gearbox assembly of any preceding clause, further comprising a gear ratio in a range of 7:1 to 12:1.

The gearbox assembly of any preceding clause, the one or more roller bearings including a first roller bearing and a second roller bearing, the second bearing located aft of the first bearing.

The gearbox assembly of any preceding clause, a distance between the first roller bearing and the second roller bearing being in a range of 159 mm to 311 mm.

The gearbox assembly of any preceding clause, further comprising a sun gear and a ring gear, the sun gear being coupled to a low pressure turbine shaft of an engine, and the ring gear being coupled to a fan shaft of the engine.

The gearbox assembly of any preceding clause, further comprising a sun gear and a ring gear, the sun gear being coupled to a low pressure turbine shaft of an engine, and the plurality of planet gears being coupled to a fan shaft of the engine.

The gearbox assembly of any preceding clause, a power rating of the engine being greater than 7 megawatts, greater than 15 megawatts, or greater than 22 megawatts.

The gearbox assembly of any preceding clause, the engine being an unducted single fan engine.

A gearbox assembly comprising a plurality of planet gears, at least one planet gear of the plurality of planet gears including a layshaft, one or more roller bearings disposed within the layshaft and including a plurality of rolling elements, a bearing radial envelope, and a layshaft axial envelope. The bearing radial envelope is in a range of 1.2 to 4.325, the bearing radial envelope being equal to $$\frac{N_r * L_r}{D_p}$$

$N_r$ being a number of rolling elements in a respective bearing, $L_r$ is a rolling element length of the plurality of rolling elements, and $D_p$ is a gear pitch diameter of the at least one planet gear. The layshaft axial envelope is in a range of 3.8 to 12.5, the layshaft axial envelope being equal to $$\frac{L}{L_r}$$

L being a layshaft axial length of the layshaft and $L_r$ is the rolling element length.

The gearbox assembly of the preceding clause, the bearing radial envelope being in a range of 1.575 to 3.95.

The gearbox assembly of any preceding clause, a ratio of the rolling element length $L_r$ and a rolling element diameter $D_r$ of the plurality of rolling elements being in a range of 1 to 2.

The gearbox assembly of any preceding clause, $N_r$ being in a range of 9 to 32.

The gearbox assembly of any preceding clause, $L_r$ being in a range of 18 mm to 67 mm.

The gearbox assembly of any preceding clause, $D_p$ being in a range of 100 mm to 400 mm.

The gearbox assembly of any preceding clause, $D_p$ being in a range of 136 mm to 360 mm.

The gearbox assembly of any preceding clause, $N_r * L_r$ being in a range of 120 mm to 1732 mm.

The gearbox assembly of any preceding clause, $N_r * L_r$ being in a range of 259.74 mm to 1329.6 mm.

The gearbox assembly of any preceding clause, the layshaft supporting a first stage planet gear and a second stage planet gear of the at least one planet gear.

The gearbox assembly of any preceding clause, the one or more roller bearings including an outer race defined by a radially inner surface of the at least one planet gear.

The gearbox assembly of any preceding clause, the layshaft axial envelope being in a range of 4.6 to 11.

The gearbox assembly of any preceding clause, L being in a range of 150 mm to 470 mm.

The gearbox assembly of any preceding clause, L being in a range of 191 mm to 406 mm.

The gearbox assembly of any preceding clause, the one or more roller bearings being disposed within the second stage planet gear.

The gearbox assembly of any preceding clause, the at least one planet gear including a rim, and the outer race being integral with the rim such that the one or more roller bearings are disposed within the rim.

The gearbox assembly of any preceding clause, the layshaft axial length being defined from an axially forward face of the at least one planet gear to an axially aft face of the at least one planet gear.

The gearbox assembly of any preceding clause, the gear pitch diameter $D_p$ being defined as a diameter of a pitch circle of the at least one planet gear.

The gearbox assembly of any preceding clause, further comprising a gear ratio in a range of 7:1 of 12:1.

The gearbox assembly of any preceding clause, the one or more roller bearings including a first roller bearing and a second roller bearing, the second roller bearing located aft of the first roller bearing.

The gearbox assembly of any preceding clause, a distance between the first roller bearing and the second roller bearing being in a range of 159 mm to 311 mm.

The gearbox assembly of any preceding clause, further comprising a sun gear and a ring gear, the sun gear being coupled to a low pressure turbine shaft of an engine, and the ring gear being coupled to a fan shaft of the engine.

The gearbox assembly of any preceding clause, further comprising a sun gear and a ring gear, the sun gear being coupled to a low pressure turbine shaft of an engine, and the plurality of planet gears being coupled to a fan shaft of the engine.

The gearbox assembly of any preceding clause, a power rating of the engine being greater than 7 megawatts, greater than 15 megawatts, or greater than 22 megawatts.

The gearbox assembly of any preceding clause, the engine being an unducted single fan engine.

An engine comprising a turbomachine, a fan, and a gearbox assembly. The turbomachine being coupled to an input shaft. The fan being coupled to an output shaft. The gearbox assembly transferring a torque from the input shaft to the output shaft. The gearbox assembly comprising a plurality of planet gears, at least one planet gear of the plurality of planet gears including a layshaft, one or more roller bearings disposed within the layshaft and including a plurality of rolling elements, and a bearing radial envelope. The bearing radial envelope is in a range of 1.2 to 4.325, the bearing radial envelope being equal to $$\frac{N_r * L_r}{D_p}$$

$N_r$ being a number of rolling elements in a respective bearing, $L_r$ is a rolling element length of the plurality of rolling elements, and $D_p$ is a gear pitch diameter of the at least one planet gear.

The engine of the preceding clause, the bearing radial envelope being in a range of 1.575 to 3.95.

The engine of any preceding clause, a ratio of the rolling element length $L_r$ and a rolling element diameter $D_r$ of the plurality of rolling elements being in a range of 1 to 2.

The engine of any preceding clause, $N_r$ being in a range of 9 to 32.

The engine of any preceding clause, $L_r$ being in a range of 18 mm to 67 mm.

The engine of any preceding clause, $D_p$ being in a range of 100 mm to 400 mm.

The engine of any preceding clause, $D_p$ being in a range of 136 mm to 360 mm.

The engine of any preceding clause, $N_r * L_r$ being in a range of 120 mm to 1732 mm.

The engine of any preceding clause, $N_r * L_r$ being in a range of 259.74 mm to 1329.6 mm.

The engine of any preceding clause, the layshaft supporting a first stage planet gear and a second stage planet gear of the at least one planet gear.

The engine of any preceding clause, the one or more roller bearings including an outer race defined by a radially inner surface of the at least one planet gear.

The engine of any preceding clause, further comprising a layshaft axial envelope in a range of 3.8 to 12.5, the layshaft axial envelope being equal to $$\frac{L}{L_r}$$

L being a layshaft axial length of the layshaft and $L_r$ is the rolling element length of the plurality of rolling elements.

The engine of any preceding clause, the layshaft axial envelope being in a range of 4.6 to 11.

The engine of any preceding clause, L being in a range of 150 mm to 470 mm.

The engine of any preceding clause, L being in a range of 191 mm to 406 mm.

The engine of any preceding clause, the one or more roller bearings being disposed within the second stage planet gear.

The engine of any preceding clause, the at least one planet gear including a rim, and the outer race being integral with the rim such that the one or more roller bearings are disposed within the rim.

The engine of any preceding clause, the layshaft axial length being defined from an axially forward face of the at least one planet gear to an axially aft face of the at least one planet gear.

The engine of any preceding clause, the gear pitch diameter $D_p$ being defined as a diameter of a pitch circle of the at least one planet gear.

The engine of any preceding clause, further comprising a gear ratio in a range of 7:1 to 12:1.

The engine of any preceding clause, the one or more roller bearings including a first roller bearing and a second roller bearing, the second roller bearing located aft of the first roller bearing.

The engine of any preceding clause, a distance between the first roller bearing and the second roller bearing being in a range of 159 mm to 311 mm.

The engine of any preceding clause, the input shaft being a low pressure turbine shaft and the output shaft is a fan shaft, the gearbox assembly further comprising a sun gear and a ring gear, the sun gear being coupled to the low pressure turbine shaft, and the ring gear being coupled to the fan shaft.

The engine of any preceding clause, the input shaft being a low pressure turbine shaft and the output shaft is a fan shaft, the gearbox assembly further comprising a sun gear and a ring gear, the sun gear being coupled to the low pressure turbine shaft, and the plurality of planet gears being coupled to the fan shaft.

The engine of any preceding clause, a power rating of the engine being greater than 7 megawatts, greater than 15 megawatts, or greater than 22 megawatts.

The engine of any preceding clause, the engine being an unducted single fan engine.

An engine comprising a turbomachine, a fan, and a gearbox assembly. The turbomachine being coupled to an input shaft. The fan being coupled to an output shaft. The gearbox assembly transferring a torque from the input shaft to the output shaft. The gearbox assembly comprising a plurality of planet gears, at least one planet gear of the plurality of planet gears including a layshaft, one or more roller bearings disposed within the layshaft and including a plurality of rolling elements, and a layshaft axial envelope. The layshaft axial envelope is in a range of 3.8 to 12.5, the layshaft axial envelope being equal to $$\frac{L}{L_r}$$

L being a layshaft axial length of the layshaft and $L_r$ is the rolling element length of the plurality of rolling elements.

The engine of the preceding clause, the layshaft axial envelope being in a range of 4.6 to 11.

The engine of any preceding clause, L being in a range of 150 mm to 470 mm.

The engine of any preceding clause, L being in a range of 191 mm to 406 mm.

The engine of any preceding clause, $L_r$ being in a range of 18 mm to 67 mm.

The engine of any preceding clause, L being in a range of 191 mm to 406 mm.

The engine of any preceding clause, further comprising a bearing radial envelope in a range of 1.2 to 4.325, the bearing radial envelope being equal to $$\frac{N_r * L_r}{D_p}$$

$N_r$ being a number of rolling elements in a respective bearing, $L_r$ is a rolling element length of the plurality of rolling elements, and $D_p$ is a gear pitch diameter of the at least one planet gear.

The engine of the preceding clause, the bearing radial envelope being in a range of 1.575 to 3.95.

The engine of any preceding clause, a ratio of the rolling element length $L_r$ and a rolling element diameter $D_r$ of the plurality of rolling elements being in a range of 1 to 2.

The engine of any preceding clause, $N_r$ being in a range of 9 to 32.

The engine of any preceding clause, $D_p$ being in a range of 100 mm to 400 mm.

The gearbox assembly of any preceding clause, $D_p$ being in a range of 136 mm to 360 mm.

The engine of any preceding clause, $N_r * L_r$ being in a range of 120 mm to 1732 mm.

The engine of any preceding clause, $N_r * L_r$ being in a range of 259.74 mm to 1329.6 mm.

The engine of any preceding clause, the layshaft supporting a first stage planet gear and a second stage planet gear of the at least one planet gear.

The engine of any preceding clause, the one or more roller bearings including an outer race defined by a radially inner surface of the at least one planet gear.

The engine of any preceding clause, the one or more roller bearings being disposed within the second stage planet gear.

The engine of any preceding clause, the at least one planet gear including a rim, and the outer race being integral with the rim such that the one or more roller bearings are disposed within the rim.

The engine of any preceding clause, the layshaft axial length being defined from an axially forward face of the at least one planet gear to an axially aft face of the at least one planet gear.

The engine of any preceding clause, the gear pitch diameter $D_p$ being defined as a diameter of a pitch circle of the at least one planet gear.

The engine of any preceding clause, the gearbox assembly further comprising a gear ratio in a range of 7:1 to 12:1.

The engine of any preceding clause, the one or more roller bearings including a first roller bearing and a second roller bearing, the second roller bearing located aft of the first roller bearing.

The engine of any preceding clause, a distance between the first roller bearing and the second roller bearing being in a range of 159 mm to 311 mm.

The engine of any preceding clause, the input shaft being a low pressure turbine shaft and the output shaft is a fan shaft, the gearbox assembly further comprising a sun gear and a ring gear, the sun gear being coupled to the low pressure turbine shaft, and the ring gear being coupled to the fan shaft.

The engine of any preceding clause, the input shaft being a low pressure turbine shaft and the output shaft is a fan shaft, the gearbox assembly further comprising a sun gear and a ring gear, the sun gear being coupled to the low pressure turbine shaft, and the plurality of planet gears being coupled to the fan shaft.

The engine of any preceding clause, a power rating of the engine being greater than 7 megawatts, greater than 15 megawatts, or greater than 22 megawatts.

The engine of any preceding clause, the engine being an unducted single fan engine.

An engine comprising a turbomachine, a fan, and a gearbox assembly. The turbomachine being coupled to an input shaft. The fan being coupled to an output shaft. The gearbox assembly transferring a torque from the input shaft to the output shaft. The gearbox assembly comprising a plurality of planet gears, at least one planet gear of the plurality of planet gears including a layshaft, one or more roller bearings disposed within the layshaft and including a plurality of rolling elements, a bearing radial envelope and a layshaft axial envelope. The bearing radial envelope is in a range of 1.2 to 4.325, the bearing radial envelope being equal to $$\frac{N_r * L_r}{D_p}$$

$N_r$ being a number of rolling elements in a respective bearing, $L_r$ is a rolling element length of the plurality of rolling elements, and $D_p$ is a gear pitch diameter of the at least one planet gear. The layshaft axial envelope is in a range of 3.8 to 12.5, the layshaft axial envelope being equal to $$\frac{L}{L_r}$$

L being a layshaft axial length of the layshaft and $L_r$ is the rolling element length.

The engine of the preceding clause, the bearing radial envelope being in a range of 1.575 to 3.95.

The engine of any preceding clause, a ratio of the rolling element length $L_r$ and a rolling element diameter $D_r$ of the plurality of rolling elements being in a range of 1 to 2.

The engine of any preceding clause, $N_r$ being in a range of 9 to 32.

The engine of any preceding clause, $L_r$ being in a range of 18 mm to 67 mm.

The engine of any preceding clause, $D_p$ being in a range of 100 mm to 400 mm.

The engine of any preceding clause, $D_p$ being in a range of 136 mm to 360 mm.

The engine of any preceding clause, $N_r*L_r$ being in a range of 120 mm to 1732 mm.

The engine of any preceding clause, $N_r*L_r$ being in a range of 259.74 mm to 1329.6 mm.

The engine of any preceding clause, the layshaft supporting a first stage planet gear and a second stage planet gear of the at least one planet gear.

The engine of any preceding clause, the one or more roller bearings including an outer race defined by a radially inner surface of the at least one planet gear.

The engine of any preceding clause, the layshaft axial envelope being in a range of 4.6 to 11.

The engine of any preceding clause, L being in a range of 150 mm to 470 mm.

The engine of any preceding clause, L being in a range of 191 mm to 406 mm.

The engine of any preceding clause, the one or more roller bearings being disposed within the second stage planet gear.

The engine of any preceding clause, the at least one planet gear including a rim, and the outer race being integral with the rim such that the one or more roller bearings are disposed within the rim.

The engine of any preceding clause, the layshaft axial length being defined from an axially forward face of the at least one planet gear to an axially aft face of the at least one planet gear.

The engine of any preceding clause, the gear pitch diameter $D_p$ being defined as a diameter of a pitch circle of the at least one planet gear.

The engine of any preceding clause, the gearbox assembly further comprising a gear ratio in a range of 7:1 to 12:1.

The engine of any preceding clause, the one or more roller bearings including a first roller bearing and a second roller bearing, the second roller bearing located aft of the first roller bearing.

The engine of any preceding clause, a distance between the first roller bearing and the second roller bearing being in a range of 159 mm to 311 mm.

The engine of any preceding clause, the input shaft being a low pressure turbine shaft and the output shaft is a fan shaft, the gearbox assembly further comprising a sun gear and a ring gear, the sun gear being coupled to the low pressure turbine shaft, and the ring gear being coupled to the fan shaft.

The engine of any preceding clause, the input shaft being a low pressure turbine shaft and the output shaft is a fan shaft, the gearbox assembly further comprising a sun gear and a ring gear, the sun gear being coupled to the low pressure turbine shaft, and the plurality of planet gears being coupled to the fan shaft.

The engine of any preceding clause, a power rating of the engine being greater than 7 megawatts, greater than 15 megawatts, or greater than 22 megawatts.

The engine of any preceding clause, the engine being an unducted single fan engine.

Although the foregoing description is directed to the preferred embodiments of the present disclosure, other variations and modifications will be apparent to those skilled in the art and may be made without departing from the spirit or the scope of the disclosure. Moreover, features described in connection with one embodiment of the present disclosure may be used in conjunction with other embodiments, even if not explicitly stated above.

The invention claimed is:

1. A gearbox assembly comprising:
a plurality of planet gears, at least one planet gear of the plurality of planet gears including a layshaft;
one or more roller bearings disposed within the layshaft and including a plurality of rolling elements; and
a bearing radial envelope in a range of 1.2 to 4.325, the bearing radial envelope being equal to $$\frac{N_r * L_r}{D_p}$$

where $N_r$ is a number of rolling elements in a respective bearing, $L_r$ is a rolling element length of the plurality of rolling elements, and $D_p$ is a gear pitch diameter of the at least one planet gear.

2. The gearbox assembly of claim 1, wherein the bearing radial envelope is in a range of 1.575 to 3.95.

3. The gearbox assembly of claim 1, wherein a ratio of the rolling element length $L_r$ and a rolling element diameter $D_r$ of the plurality of rolling elements is in a range of 1 to 2.

4. The gearbox assembly of claim 1, wherein $N_r$ is in a range of 9 to 32.

5. The gearbox assembly of claim 1, wherein $L_r$ is in a range of 18 mm to 67 mm.

6. The gearbox assembly of claim 1, wherein $D_p$ is in a range of 100 mm to 400 mm.

7. The gearbox assembly of claim 1, wherein $N_r*L_r$ is in a range of 120 mm to 1732 mm.

8. The gearbox assembly of claim 1, wherein the one or more roller bearings include a first roller bearing and a second roller bearing, and a distance between the first roller bearing and the second roller bearing is in a range of 159 mm to 311 mm.

9. The gearbox assembly of claim 1, wherein the layshaft supports a first stage planet gear and a second stage planet gear of the at least one planet gear.

10. The gearbox assembly of claim 1, wherein the one or more roller bearings include an outer race defined by a radially inner surface of the at least one planet gear.

11. The gearbox assembly of claim 1, further including a layshaft axial envelope in a range of 3.8 to 12.5, the layshaft axial envelope being equal to $$\frac{L}{L_r}$$

where L is a layshaft axial length of the layshaft and $L_r$ is the rolling element length of the plurality of rolling elements.

12. The gearbox assembly of claim 11, wherein the layshaft axial envelope is in a range of 4.6 to 11.

13. The gearbox assembly of claim 11, wherein L is in a range of 150 mm to 470 mm.

14. A gearbox assembly comprising:
a plurality of planet gears, at least one planet gear of the plurality of planet gears including a layshaft;
one or more roller bearings disposed within the layshaft and including a plurality of rolling elements; and
a layshaft axial envelope in a range of 3.8 to 12.5, the layshaft axial envelope being equal to $$\frac{L}{L_r}$$

where L is a layshaft axial length of the layshaft and L is a rolling element length of the plurality of rolling elements.

15. The gearbox assembly of claim 14, wherein the layshaft axial envelope is in a range of 4.6 to 11.

16. The gearbox assembly of claim 14, wherein L is in a range of 150 mm to 470 mm.

17. The gearbox assembly of claim 14, wherein $L_r$ is in a range of 18 mm to 67 mm.

18. The gearbox assembly of claim 14, wherein the one or more roller bearings include a first roller bearing and a second roller bearing, and a distance between the first roller bearing and the second roller bearing is in a range of 159 mm to 311 mm.

19. The gearbox assembly of claim 14, wherein the layshaft supports a first stage planet gear and a second stage planet gear of the at least one planet gear.

20. The gearbox assembly of claim 14, wherein the one or more roller bearings include an outer race defined by a radially inner surface of the at least one planet gear.

* * * * *